United States Patent
Ueno et al.

(10) Patent No.: US 10,688,928 B2
(45) Date of Patent: Jun. 23, 2020

(54) PEDESTRIAN-VEHICLE COMMUNICATION SYSTEM, IN-VEHICLE TERMINAL DEVICE, PEDESTRIAN TERMINAL DEVICE AND SAFE-DRIVING ASSISTANCE METHOD

(71) Applicant: PANASONIC CORPORATION, Osaka (JP)

(72) Inventors: Tsuyoshi Ueno, Kanagawa (JP); Satoshi Tanaka, Kochi (JP); Hiroaki Sudo, Kanagawa (JP); Yoshimasa Shirosaki, Kanagawa (JP); Shintaro Muramatsu, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/342,456

(22) PCT Filed: Jun. 29, 2017

(86) PCT No.: PCT/JP2017/023958
§ 371 (c)(1),
(2) Date: Apr. 16, 2019

(87) PCT Pub. No.: WO2018/074011
PCT Pub. Date: Apr. 26, 2018

(65) Prior Publication Data
US 2020/0047668 A1    Feb. 13, 2020

(30) Foreign Application Priority Data
Oct. 20, 2016   (JP) ................. 2016-205658

(51) Int. Cl.
*B60Q 1/00*   (2006.01)
*B60Q 9/00*   (2006.01)
(Continued)

(52) U.S. Cl.
CPC ............ *B60Q 9/008* (2013.01); *B60W 50/14* (2013.01); *G08G 1/005* (2013.01); *G08G 1/166* (2013.01);
(Continued)

(58) Field of Classification Search
CPC ........ B60Q 9/008; H04W 4/40; B60W 50/14; B60W 2050/146; B60W 2550/10; B60W 2550/40; G08G 1/005; G08G 1/166
(Continued)

(56) References Cited

U.S. PATENT DOCUMENTS

| | | | |
|---|---|---|---|
| 2005/0073438 A1* | 4/2005 | Rodgers | G08G 1/161 340/944 |
| 2011/0090093 A1* | 4/2011 | Grimm | G08G 1/162 340/901 |

(Continued)

FOREIGN PATENT DOCUMENTS

| | | |
|---|---|---|
| JP | 2001-357496 | 12/2001 |
| JP | 2002-342899 | 11/2002 |

(Continued)

OTHER PUBLICATIONS

International Search Report issued in International Pat. Appl. No. PCT/JP2017/023958, dated Sep. 26, 2017.

*Primary Examiner* — Zhen Y Wu
(74) *Attorney, Agent, or Firm* — Greenblum & Bernstein, P.L.C.

(57) ABSTRACT

In order to enable a driver in driving a vehicle to quickly and assuredly recognize a pedestrian having a collision risk with the vehicle even when it is difficult for the driver to recognize the pedestrian by eyes, such as during night time, an in-vehicle terminal device is configured to: determine a collision risk based on pedestrian position information and vehicle position information; generate turn-on instruction
(Continued)

information which, when the pedestrian is determined to have the collision risk with the vehicle, causes an indicator light carried by the pedestrian to be turned on in a prescribed light color; and transmit the turn-on instruction information to a pedestrian terminal device via pedestrian-vehicle communication, and wherein the pedestrian terminal device is configured to: receive the turn-on instruction information transmitted from the in-vehicle terminal device; and turn on the indicator light based on the turn-on instruction information.

15 Claims, 17 Drawing Sheets

(51) Int. Cl.
    *H04W 4/40* (2018.01)
    *B60W 50/14* (2020.01)
    *G08G 1/005* (2006.01)
    *G08G 1/16* (2006.01)
(52) U.S. Cl.
    CPC ........ *H04W 4/40* (2018.02); *B60W 2050/146* (2013.01); *B60W 2554/00* (2020.02); *B60W 2556/45* (2020.02)
(58) Field of Classification Search
    USPC ........................................................ 340/436
    See application file for complete search history.

(56) References Cited

U.S. PATENT DOCUMENTS

| | | | |
|---|---|---|---|
| 2011/0128139 A1* | 6/2011 | Tauchi | B60Q 9/008 340/439 |
| 2011/0246156 A1* | 10/2011 | Zecha | G06K 9/00342 703/6 |
| 2012/0025964 A1* | 2/2012 | Beggs | B60Q 1/26 340/435 |
| 2015/0035685 A1* | 2/2015 | Strickland | B60Q 1/525 340/901 |
| 2015/0109148 A1* | 4/2015 | Cheatham, III | G01S 7/4804 340/944 |
| 2015/0109149 A1* | 4/2015 | Duncan | G02B 27/017 340/944 |
| 2016/0219029 A1* | 7/2016 | Oshida | H04L 63/0442 |
| 2016/0343256 A1* | 11/2016 | Song | H04L 67/26 |
| 2017/0092126 A1* | 3/2017 | Oshida | G08G 1/005 |
| 2017/0253181 A1* | 9/2017 | Choi | B60K 35/00 |
| 2017/0268896 A1* | 9/2017 | Bai | G01C 21/3697 |
| 2017/0301238 A1* | 10/2017 | Brandriff | B60R 1/00 |
| 2017/0334355 A1* | 11/2017 | Hubbell | G08G 1/167 |
| 2018/0005254 A1* | 1/2018 | Bai | H04L 67/12 |
| 2018/0009378 A1* | 1/2018 | Myers | H04N 7/18 |
| 2018/0033306 A1* | 2/2018 | Kim | G06K 9/00369 |
| 2018/0090004 A1* | 3/2018 | Kuraoka | G08G 1/164 |
| 2018/0170250 A1* | 6/2018 | Hanninen | B60Q 9/008 |
| 2018/0197412 A1* | 7/2018 | Uchiyama | G08G 1/0112 |
| 2018/0233048 A1* | 8/2018 | Andersson | B60Q 5/006 |
| 2018/0234935 A1* | 8/2018 | Uchiyama | H04W 56/0015 |
| 2018/0242367 A1* | 8/2018 | Kim | H04L 5/001 |
| 2018/0255525 A1* | 9/2018 | Uchiyama | H04W 4/40 |
| 2018/0281788 A1* | 10/2018 | Uchida | B60W 30/0953 |
| 2018/0295474 A1* | 10/2018 | Lee | H04L 67/12 |

FOREIGN PATENT DOCUMENTS

| | | |
|---|---|---|
| JP | 2012-048537 | 3/2012 |
| JP | 2015-141553 | 8/2015 |
| JP | 2015-219113 | 12/2015 |
| WO | 2015/152304 | 10/2015 |

* cited by examiner

Fig.6
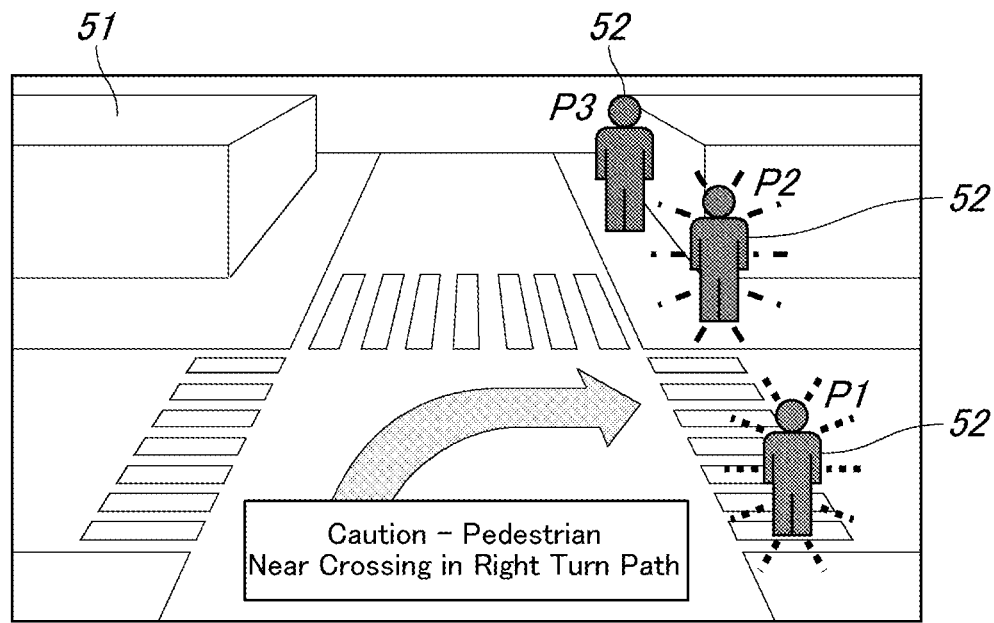
(A)
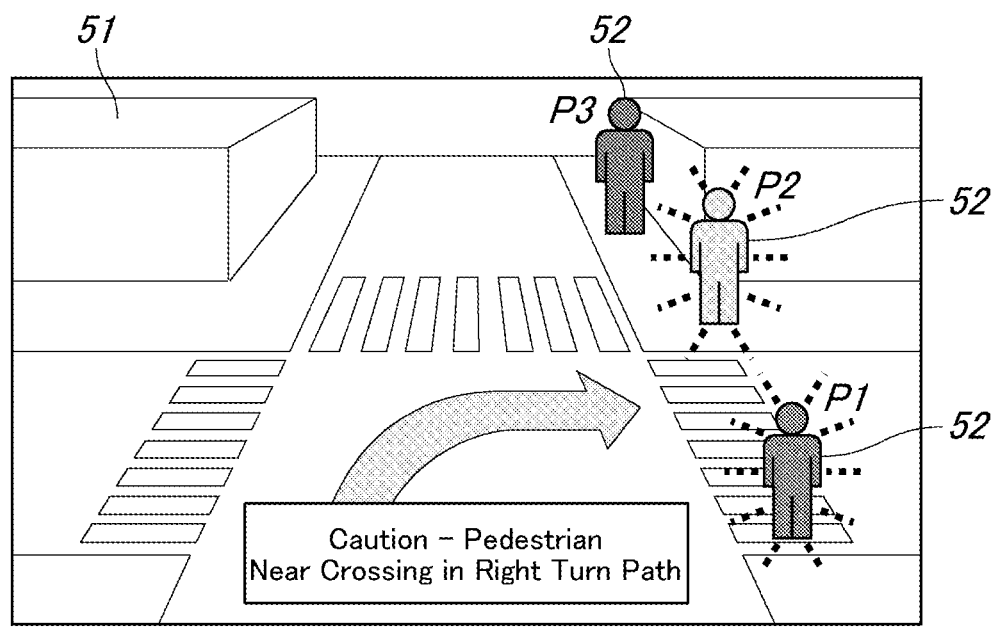
(B)

*Fig.15*
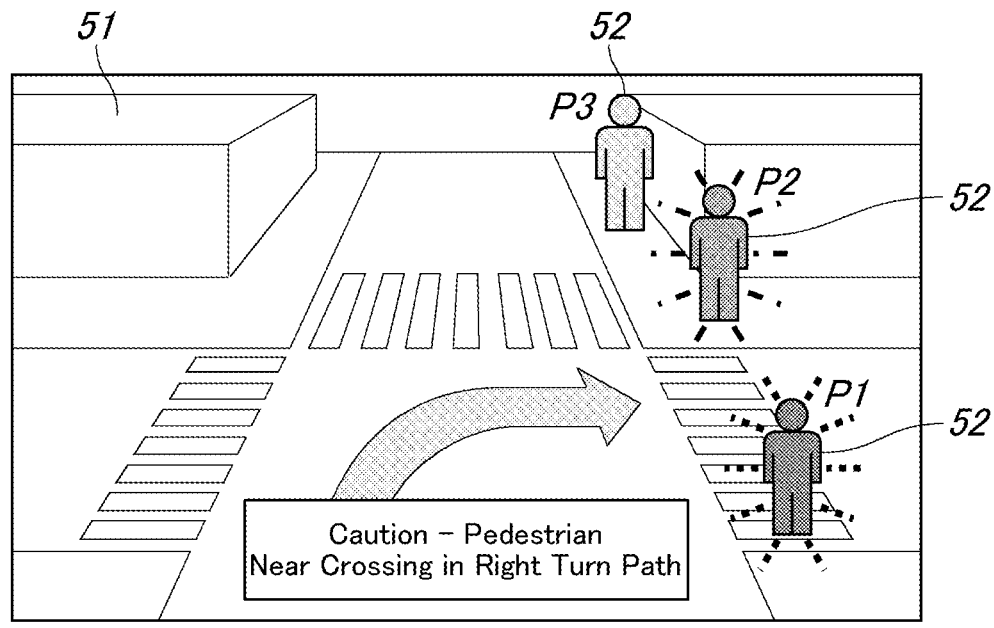
(A)
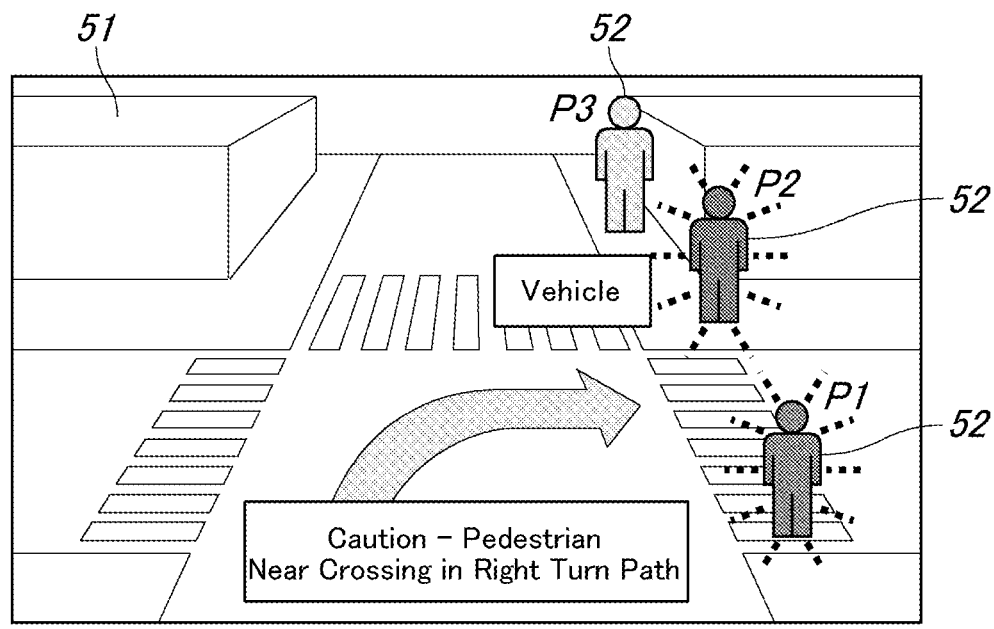
(B)

US 10,688,928 B2

PEDESTRIAN-VEHICLE COMMUNICATION SYSTEM, IN-VEHICLE TERMINAL DEVICE, PEDESTRIAN TERMINAL DEVICE AND SAFE-DRIVING ASSISTANCE METHOD

TECHNICAL FIELD

The present invention relates to a pedestrian-vehicle communication system comprising an in-vehicle terminal device mounted on a vehicle and a pedestrian terminal device carried by a pedestrian, wherein pedestrian position information and vehicle position information are transmitted and received between the in-vehicle terminal device and the pedestrian terminal device via pedestrian-vehicle communication. The present invention also relates to an in-vehicle terminal device, a pedestrian terminal device, and a safe-driving assistance method for assisting a driver in driving a vehicle by performing pedestrian-vehicle communication.

BACKGROUND ART

In recent years, studies have been in progress for the practical and widespread use of safe driver assistance wireless systems by utilizing ITS (Intelligent Transport System). In such safe driver assistance wireless systems, in order to alert drivers in vehicles to avoid accidents, vehicle position information and other information are transmitted and received between two or more in-vehicle terminal devices mounted on vehicles via vehicle-vehicle communication and are also transmitted and received between roadside devices provided in roadside and in-vehicle terminal devices via roadside-vehicle communication.

In recent years, pedestrian-vehicle communication technologies have been presented in which a pedestrian terminal device carried by a pedestrian communicates directly with in-vehicle terminal devices in order to prevent pedestrian accidents. Since, in this pedestrian-vehicle communication, direct communication between a pedestrian terminal device and an in-vehicle terminal device enables alerts to be provided to both the pedestrian and the vehicle drivers at an appropriate time, this technology is expected to significantly prevent traffic accidents involving pedestrians.

In such a pedestrian-vehicle communication, pedestrian information including pedestrian position information is transmitted from a pedestrian terminal device carried by a pedestrian to an in-vehicle terminal device mounted on a vehicle, and upon receiving the pedestrian information, the in-vehicle terminal device makes a collision determination to determine whether or not the own vehicle has a high collision risk with the pedestrian; that is, whether or not the own vehicle is highly likely to collide with the pedestrian, and provides an alert to the driver in the vehicle when it is determined necessary from the result of the collision determination.

Generally, in order to alert a driver, a warning sound or a warning voice announcement is produced or a warning image is displayed on a display device. However, such an alert alone is not sufficient for a driver to instantly grasp where a pedestrian with a high collision risk is located and which pedestrian around the driver's vehicle has a collision risk. Thus, there is a need to indicate the presence of a pedestrian with a significant collision risk on a display screen.

Such prior art technologies concerning the notification to a driver of the presence of a pedestrian with a collision risk include a pedestrian detection system including an in-vehicle display device configured to produce a map on which the locations of pedestrians are indicated with marks having different colors or shapes which are determined depending on the degree of risk (See Patent Document 1). Known technologies further include a device configured to notify a driver of the presence of a pedestrian with a collision risk by displaying an alert image projected on a windshield or using other display methods (See Patent Document 2).

PRIOR ART DOCUMENT (S)

Patent Document(s)

Patent Document 1: JP2015-219113A
Patent Document 2: WO2015/152304A

SUMMARY OF THE INVENTION

Task to be Accomplished by the Invention

However, there is a problem that, during night time, it becomes difficult to recognize pedestrians by eyes and thus, even when a display device displays the location of a pedestrian having a high collision risk, a driver cannot instantly grasp where the actual pedestrian is located and it takes some time for the driver to grasp the location of the pedestrian.

The present invention has been made in view of such problems of the prior art, and a primary object of the present invention is to provide a pedestrian-vehicle communication system, an in-vehicle terminal device, and an safe-driving assistance method, which enable a driver to quickly and assuredly recognize a pedestrian having a collision risk even in a situation in which drivers cannot easily recognize pedestrians by eyes, such as during night time.

Means to Accomplish the Task

An aspect of the present invention provides a pedestrian-vehicle communication system comprising an in-vehicle terminal device mounted on a vehicle and a pedestrian terminal device carried by a pedestrian, wherein pedestrian position information and vehicle position information are transmitted and received between the in-vehicle terminal device and the pedestrian terminal device via pedestrian-vehicle communication, wherein the in-vehicle terminal device comprises: a collision determiner configured to determine a collision risk based on the pedestrian position information and the vehicle position information; a turn-on instruction generator configured to generate turn-on instruction information which, when the collision determiner determines that the pedestrian has the collision risk, causes an indicator light carried by the pedestrian to be turned on in a prescribed light color; and a pedestrian-vehicle communicator configured to transmit the turn-on instruction information to the pedestrian terminal device via the pedestrian-vehicle communication; and wherein the pedestrian terminal device comprises: a pedestrian-vehicle communicator configured to receive the turn-on instruction information transmitted from the in-vehicle terminal device; and a turn-on controller configured to turn on the indicator light based on the turn-on instruction information.

Another aspect of the present invention provides an in-vehicle terminal device mounted on a vehicle for performing pedestrian-vehicle communication with a pedestrian terminal device carried by a pedestrian, wherein pedestrian position information and vehicle position information are transmitted and received between the in-vehicle terminal device and the pedestrian terminal device via the pedestrian-vehicle communication, comprising: a collision determiner configured to determine a collision risk based on the pedestrian position information and the vehicle position information; a turn-on instruction generator configured to generate turn-on instruction information which, when the collision determiner determines that the pedestrian has the collision risk, causes an indicator light carried by the pedestrian to be turned on in a prescribed light color; and a pedestrian-vehicle communicator configured to transmit the turn-on instruction information to the pedestrian terminal device via the pedestrian-vehicle communication.

Another aspect of the present invention provides a pedestrian terminal device carried by a pedestrian for performing pedestrian-vehicle communication with an in-vehicle terminal device mounted on a vehicle, wherein pedestrian position information and vehicle position information are transmitted and received between the in-vehicle terminal device and the pedestrian terminal device via the pedestrian-vehicle communication, comprising: a short range communicator configured to perform communication with an indicator light carried by the pedestrian; a pedestrian-vehicle communicator configured to receive turn-on instruction information from the in-vehicle terminal device, the turn-on instruction information causing the indicator light carried by the pedestrian to be turned on in a prescribed light color; and a turn-on controller to turn on the indicator light by the short range communicator based on the turn-on instruction information.

Yet another aspect of the present invention provides a safe-driving assistance method for assisting a driver in driving a vehicle by performing pedestrian-vehicle communication through which pedestrian position information and vehicle position information are transmitted and received between an in-vehicle terminal device mounted on the vehicle and a pedestrian terminal device carried by a pedestrian, wherein the in-vehicle terminal device: determines a collision risk based on the pedestrian position information and the vehicle position information; generates turn-on instruction information which, when the collision determiner determines that the pedestrian has the collision risk, causes an indicator light carried by the pedestrian to be turned on in a prescribed light color; and transmits the turn-on instruction information to the pedestrian terminal device via the pedestrian-vehicle communication; and wherein the pedestrian terminal device: receives the turn-on instruction information transmitted from the in-vehicle terminal device; and turns on the indicator light based on the turn-on instruction information.

Effect of the Invention

According to the present invention, since an indicator light carried by a pedestrian having a collision risk is turned on, a driver can quickly and assuredly recognize such pedestrians having collision risks.

BRIEF DESCRIPTION OF THE DRAWINGS

FIG. 5 is an explanatory view showing situations regarding how indicator lights 3 of pedestrians are turned on;

FIG. 6 is an explanatory view showing images displayed on a display screen of a navigation device 5;

FIG. 15 is an explanatory view showing images displayed on a display screen of a navigation device 5;

DESCRIPTION OF THE PREFERRED EMBODIMENT(S)

Figure 1:
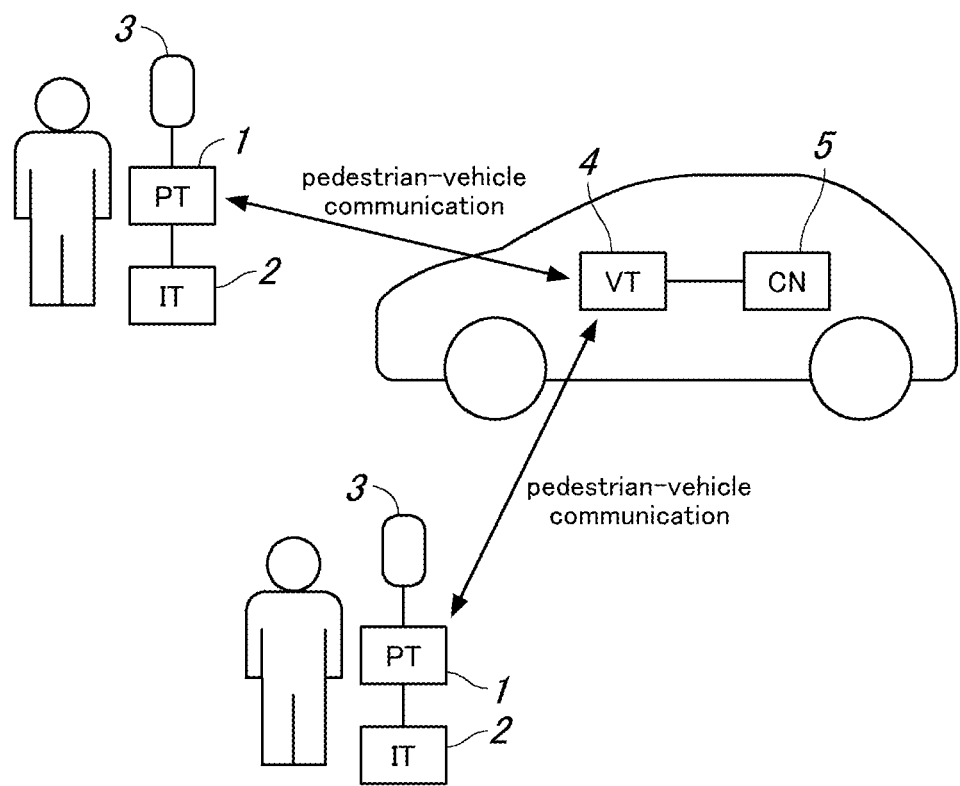
FIG. 1 is a diagram showing a general configuration of a pedestrian-vehicle communication system according to a first embodiment of the present invention.

A first aspect of the present invention made to achieve the above-described object is a pedestrian-vehicle communication system comprising an in-vehicle terminal device mounted on a vehicle and a pedestrian terminal device carried by a pedestrian, wherein pedestrian position information and vehicle position information are transmitted and received between the in-vehicle terminal device and the pedestrian terminal device via pedestrian-vehicle communication, wherein the in-vehicle terminal device comprises: a collision determiner configured to determine a collision risk based on the pedestrian position information and the vehicle position information; a turn-on instruction generator configured to generate turn-on instruction information which, when the collision determiner determines that the pedestrian has the collision risk, causes an indicator light carried by the pedestrian to be turned on in a prescribed light color; and a pedestrian-vehicle communicator configured to transmit the turn-on instruction information to the pedestrian terminal device via the pedestrian-vehicle communication; and wherein the pedestrian terminal device comprises: a pedestrian-vehicle communicator configured to receive the turn-on instruction information transmitted from the in-vehicle terminal device; and a turn-on controller configured to turn on the indicator light based on the turn-on instruction information.

According to the first aspect of the present invention, since the indicator light carried by the pedestrian having a collision risk is turned on, the driver can quickly and assuredly recognize such pedestrians having collision risks.

A second aspect of the present invention is the pedestrian-vehicle communication system according to the first aspect, wherein the turn-on instruction generator of the in-vehicle terminal device generates the turn-on instruction information which causes the indicator light to be turned on in a light color specific to the vehicle on which the in-vehicle terminal device is mounted.

According to the second aspect of the present invention, the driver can quickly recognize a pedestrian having a collision risk with the own vehicle.

A third aspect of the present invention is the pedestrian-vehicle communication system according to the second aspect, wherein, upon receiving the turn-on instruction information from a plurality of in-vehicle terminal devices, the turn-on controller of the pedestrian terminal device causes the indicator light to be turned on based on the turn-on instruction information which is transmitted from the in-vehicle terminal device of the vehicle having a highest collision risk.

According to the third aspect of the present invention, since the light color is set based on the turn-on instruction information chosen with priority given to the information from the in-vehicle terminal device of the vehicle having the highest collision risk, the driver of the vehicle having the highest collision risk can quickly recognize a pedestrian having a collision risk with the own vehicle.

A fourth aspect of the present invention is the pedestrian-vehicle communication system according to the first aspect, wherein, when there are a plurality of pedestrians having collision risks with the vehicle, the turn-on instruction generator of the in-vehicle terminal device generates the turn-on instruction information which causes the plurality of indicator lights to be turned on in respective different light colors.

According to the fourth aspect of the present invention, since the lights of the pedestrians have different light colors assigned, a driver can easily identify the multiple pedestrians.

A fifth aspect of the present invention is the pedestrian-vehicle communication system according to the fourth aspect, wherein the turn-on instruction generator of the in-vehicle terminal device generates turn-on instruction information which causes the indicator light without any assigned light color to be turned on in a prescribed light color based on color information transmitted from the pedestrian terminal device.

According to the fifth aspect of the present invention, the indicator light of a pedestrian having a collision risks can be turned on in an appropriate light color.

A sixth aspect of the present invention is the pedestrian-vehicle communication system according to the first aspect, wherein the in-vehicle terminal device comprises a display controller configure to display an image representing a position of the pedestrian superimposed on a map image on a display screen of a display device mounted on the vehicle, and wherein the display controller causes the display device to display the image representing the position of the pedestrian in a same color as the light color of the indicator light of the pedestrian.

According to the sixth aspect of the present invention, since the color of an indication of each pedestrian displayed on the display device of the vehicle matches the light color of a corresponding indicator light of the pedestrian, the driver of the vehicle can instantly grasp the correspondence between each of the actual pedestrians and a corresponding pedestrian indication on the display screen of the display device. This enables the driver to quickly confirm each actual pedestrian by reference to the display screen of the display device. In particular, when different light colors are assigned to respective pedestrians, the driver of the vehicle can easily grasp the correspondence between the actual pedestrians and the respective pedestrians displayed on the display screen of the display device.

A seventh aspect of the present invention is a pedestrian-vehicle communication system comprising an in-vehicle terminal device mounted on a vehicle and a pedestrian terminal device carried by a pedestrian, wherein pedestrian position information and vehicle position information are transmitted and received between the in-vehicle terminal device and the pedestrian terminal device via pedestrian-vehicle communication, wherein the pedestrian terminal device comprises: a collision determiner configured to determine a collision risk based on the pedestrian position information and the vehicle position information; a turn-on controller configured, when the collision determiner determines that the collision risk is present, to turn on an indicator light carried by the pedestrian in a prescribed light color, and wherein the in-vehicle terminal device comprises: a pedestrian-vehicle communicator configured to receive color information indicating the prescribed light color from the pedestrian terminal device; and a display controller configured to cause a display device mounted on the vehicle to display an image representing a position of the pedestrian in a same color as the prescribed light color indicated by the color information.

According to the seventh aspect of the present invention, since the color of an indication of each pedestrian displayed on the display device of the vehicle matches the light color of a corresponding indicator light of the pedestrian, the driver of the vehicle can instantly grasp the correspondence between each of the actual pedestrians and a corresponding pedestrian indication on the display screen of the display device. This enables the driver to quickly confirm each actual pedestrian by reference to the display screen of the display device.

An eighth aspect of the present invention is the pedestrian-vehicle communication system according to the seventh aspect, wherein the turn-on controller of the pedestrian terminal device causes the indicator light to be turned on in the light color which is set depending on a user attribute of the pedestrian.

According to the eighth aspect of the present invention, the driver of the vehicle can easily identify what types of pedestrians are present.

A ninth aspect of the present invention is the pedestrian-vehicle communication system according to the eighth aspect, the user attribute is classified according to a possibility of taking a dangerous action.

According to the ninth aspect of the present invention, the driver of the vehicle can easily identify a pedestrian who is likely to take a dangerous action.

A tenth aspect of the present invention is the pedestrian-vehicle communication system according to the seventh aspect, wherein the collision determiner of the pedestrian terminal device determines a plurality of assistance levels according to the collision risk, and the turn-on controller of the pedestrian terminal device sets the light color depending on the assistance levels.

According to the tenth aspect of the present invention, since the light color varies according to the assistance level, the driver of the vehicle can instantly identify how high a collision risk each pedestrian has.

An eleventh aspect of the present invention is the pedestrian-vehicle communication system according to the tenth aspect, wherein, when a plurality of vehicles have collision risks with the pedestrian, the turn-on controller of the pedestrian terminal device sets the light color based on the assistance level for the vehicle having a highest collision risk with the pedestrian.

According to the eleventh aspect of the present invention, since the light color is set based on the assistance level chosen with priority given to that associated with the vehicle having the highest collision risk, the driver of the vehicle can quickly recognize a pedestrian having a high collision risk with the own vehicle.

A twelfth aspect of the present invention is the pedestrian-vehicle communication system according to the first aspect, the collision determiner of the pedestrian terminal device determines a plurality of assistance levels according to on the collision risk, and the turn-on controller of the pedestrian terminal device changes a turn-on pattern of the indicator light depending on the assistance levels.

According to the twelfth aspect of the present invention, since the turn-on pattern (e.g. fast blinking, slow blinking, or always-on) of the indicator light changes according to the assistance level, the driver of the vehicle can quickly identify how high a collision risk each pedestrian has.

A thirteenth aspect of the present invention is an in-vehicle terminal device mounted on a vehicle for performing pedestrian-vehicle communication with a pedestrian terminal device carried by a pedestrian, wherein pedestrian position information and vehicle position information are transmitted and received between the in-vehicle terminal device and the pedestrian terminal device via the pedestrian-vehicle communication, comprising: a collision determiner configured to determine a collision risk based on the pedestrian position information and the vehicle position information; a turn-on instruction generator configured to generate turn-on instruction information which, when the collision determiner determines that the pedestrian has the collision risk, causes an indicator light carried by the pedestrian to be turned on in a prescribed light color; and a pedestrian-vehicle communicator configured to transmit the turn-on instruction information to the pedestrian terminal device via the pedestrian-vehicle communication.

According to the thirteenth aspect of the present invention, since the indicator light carried by the pedestrian having a collision risk is turned on according to the instruction from the in-vehicle terminal device, the driver can quickly and assuredly recognize such pedestrians having collision risks.

A fourteenth aspect of the present invention is an in-vehicle terminal device mounted on a vehicle for performing pedestrian-vehicle communication with a pedestrian terminal device carried by a pedestrian, wherein pedestrian position information and vehicle position information are transmitted and received between the in-vehicle terminal device and the pedestrian terminal device via the pedestrian-vehicle communication, comprising: a pedestrian-vehicle communicator configured to receive color information from the pedestrian terminal device, the color information indicating a light color of an indicator light carried by the pedestrian; and a display controller mounted on the vehicle configured to cause a display device mounted on the vehicle to display an image representing a position of the pedestrian in a same color as the light color indicated by the color information.

According to the fourteenth aspect of the present invention, since the color of an image indicating each pedestrian displayed on the display device of the vehicle matches the light color of a corresponding indicator light of the pedestrian, the driver of the vehicle can instantly grasp the correspondence between each of the actual pedestrians and a corresponding pedestrian indication on the display screen of the display device.

A fifteenth aspect of the present invention is a pedestrian terminal device carried by a pedestrian for performing pedestrian-vehicle communication with an in-vehicle terminal device mounted on a vehicle, wherein pedestrian position information and vehicle position information are transmitted and received between the in-vehicle terminal device and the pedestrian terminal device via the pedestrian-vehicle communication, comprising: a short range communicator configured to perform communication with an indicator light carried by the pedestrian; a pedestrian-vehicle communicator configured to receive turn-on instruction information from the in-vehicle terminal device, the turn-on instruction information causing the indicator light carried by the pedestrian to be turned on in a prescribed light color; and a turn-on controller to turn on the indicator light by the short range communicator based on the turn-on instruction information.

According to the fifteenth aspect of the present invention, since the indicator light carried by the pedestrian having a collision risk is turned on according to the instruction from the in-vehicle terminal device, the driver can quickly and assuredly recognize such pedestrians having collision risks.

A sixteenth aspect of the present invention is a pedestrian terminal device carried by a pedestrian for performing pedestrian-vehicle communication with an in-vehicle terminal device mounted on a vehicle, wherein pedestrian position information and vehicle position information are transmitted and received between the in-vehicle terminal device and the pedestrian terminal device via the pedestrian-vehicle communication, comprising: a short range communicator configured to perform communication with an indicator light carried by the pedestrian; an information storage configured to store color information which causes the indicator light to be turned on; a collision determiner configured to determine a collision risk based on the pedestrian position information and the vehicle position information; a turn-on controller configured to, when the collision determiner determines that the collision risk is present, causes the short range communicator to turn on the indicator light based on the color information; and a pedestrian-vehicle communicator configured to transmit the color information to the in-vehicle terminal device via the pedestrian-vehicle communication.

According to the sixteenth aspect of the present invention, since the pedestrian having a collision risk with the vehicle is turned on in a prescribed color and the light color is notified to the in-vehicle terminal device, an indication of the pedestrian can be displayed on the display device of the vehicle in the same color as the light color of the actual pedestrian. As a result, the driver of the vehicle can instantly grasp the correspondence between each of the actual pedestrians and a corresponding pedestrian indication on the display screen of the display device.

A seventeenth aspect of the present invention, a safe-driving assistance method for assisting a driver in driving a vehicle by performing pedestrian-vehicle communication through which pedestrian position information and vehicle position information are transmitted and received between an in-vehicle terminal device mounted on the vehicle and a pedestrian terminal device carried by a pedestrian, wherein the in-vehicle terminal device: determines a collision risk based on the pedestrian position information and the vehicle position information; generates turn-on instruction information which, when the collision determiner determines that the pedestrian has the collision risk, causes an indicator light carried by the pedestrian to be turned on in a prescribed light color; and transmits the turn-on instruction information to the pedestrian terminal device via the pedestrian-vehicle communication; and wherein the pedestrian terminal device: receives the turn-on instruction information transmitted from the in-vehicle terminal device; and turns on the indicator light based on the turn-on instruction information.

According to the seventeenth aspect of the present invention, since the indicator light carried by the pedestrian having a collision risk is turned on in the same manner as the first aspect, the driver can quickly and assuredly recognize such pedestrians having collision risks.

An eighteenth aspect of the present invention is a safe-driving assistance method for assisting a driver in driving a vehicle by performing pedestrian-vehicle communication through which pedestrian position information and vehicle position information are transmitted and received between an in-vehicle terminal device mounted on the vehicle and a pedestrian terminal device carried by a pedestrian, wherein the pedestrian terminal device: determines a collision risk based on the pedestrian position information and the vehicle position information; when the collision determiner determines that the collision risk is present, turns on an indicator light carried by the pedestrian in a prescribed light color; and transmits color information indicating the prescribed light color to the in-vehicle terminal device via the pedestrian-vehicle communication, and wherein the in-vehicle terminal device: receives the color information transmitted from the pedestrian terminal device; and causes a display device mounted on the vehicle to display an image representing a position of the pedestrian in a same color as the light color of the indicator light of the pedestrian.

According to the eighteenth aspect of the present invention, since the color of an indication of each pedestrian displayed on the display device of the vehicle matches the light color of a corresponding indicator light of the pedestrian in the same manner as the seventh aspect, the driver of the vehicle can instantly grasp the correspondence between each of the actual pedestrians and a corresponding pedestrian indication on the display screen of the display device. This enables the driver to quickly confirm each actual pedestrian by reference to the display screen of the display device.

Embodiments of the present invention will be described below with reference to the drawings.

First Embodiment

FIG. 1 is a diagram showing a general configuration of a pedestrian-vehicle communication system according to a first embodiment of the present invention.

The pedestrian-vehicle communication system includes a pedestrian terminal device 1 (pedestrian-carried pedestrian terminal device), a mobile information terminal device 2 equipped with an indicator light 3, and an in-vehicle terminal device 4 and a navigation device 5 (display device) mounted on a vehicle.

The pedestrian terminal device 1 has a positioning function for acquiring position information of the device itself, and a communication function for performing a pedestrian-vehicle communication with the in-vehicle terminal device 4. Based on the positions, traveling directions, traveling speeds and other pieces of information of the pedestrian and the vehicle acquired by using these functions, the pedestrian terminal device 1 makes collision determination; that is, determines whether or not there is a vehicle which has a collide risk with the pedestrian who owns the pedestrian terminal device.

The mobile information terminal device 2 may be a smartphone, a mobile phone, a tablet terminal, a wearable terminal, or other types of terminals. The pedestrian terminal device 1 and the mobile information terminal device 2 are connected to each other, and when the pedestrian terminal device 1 determines that the pedestrian terminal device has a high collision risk with a vehicle, the pedestrian terminal device 1 causes the mobile information terminal device 2 to perform an assist operation (e.g., voice announcement or vibration) for the pedestrian in order to avoid the occurrence of an accident. In some cases, the pedestrian terminal device 1 itself may perform the assist operation.

The indicator light 3 is carried by the pedestrian, and causes drivers of vehicles to recognize the presence of the pedestrian, and includes an LED as a light source, a control circuit, a battery and other elements. In order to have the indicator light 3 always visible from vehicle drivers, the indicator light 3 is configured to have an attachment such as a key ring or a strap that can be attached to the pedestrian's belongings, such as a bag, or be a wearable accessory such as a bracelet which can be worn by the pedestrian. The indicator light may be designed as a wearable terminal. The indicator light 3 also has a communication function for communicating with the pedestrian terminal device 1, and its turn-on and turn-off operations are controlled by the pedestrian terminal device 1. In some embodiments, the indicator light 3 may be integrally provided in the pedestrian terminal device 1 or the mobile information terminal device 2.

The in-vehicle terminal device 4 has a positioning function of acquiring information on the position of the device itself, and a communication function of performing pedestrian-vehicle communication with the pedestrian terminal device 1. Based on the positions, traveling directions, traveling speeds, and other pieces of information of the pedestrian and the vehicle acquired by using these functions, the in-vehicle terminal device makes a collision determination; that is, determines whether or not the vehicle on which the device is mounted has a collision risk with a pedestrian.

The navigation device 5 provides route guidance for the driver. The in-vehicle terminal device 4 and the navigation device 5 are connected to each other, and when the in-vehicle terminal device 4 determines that the in-vehicle terminal device has a high collision risk with pedestrian, the in-vehicle terminal device 4 causes the navigation device 5 to perform an assist operation (e.g., voice announcement or display) for the driver in order to avoid the occurrence of an accident. In some cases, the in-vehicle terminal device 4 itself may perform the assist operation.

The in-vehicle terminal device 4 may be connected to the mobile information terminal device 2 possessed by the driver to thereby allow the mobile information terminal device 2 to perform an assist operation for the driver.

The pedestrian terminal device 1 may be built into the mobile information terminal device 2, and the in-vehicle terminal device 4 may be built into the navigation device 5.

In this pedestrian-vehicle communication system, the pedestrian terminal device 1 and the in-vehicle terminal device 4 mutually exchange information such as the positions, the traveling directions, and the traveling speeds of the pedestrian and the vehicle, which are needed to make the collision determination(s), via the pedestrian-vehicle communication using a frequency band (for example, 700 MHz band or 5.8 GHz band), which is adopted in safe driver assistance wireless systems utilizing an ITS (Intelligent Transport System).

In the pedestrian-vehicle communication, messages are transmitted and received between the pedestrian terminal device 1 and the in-vehicle terminal device 4. The messages transmitted from pedestrian terminal device 1 includes pedestrian position information, information on the traveling direction and traveling speed of the pedestrian acquired by a sensor (not shown) provided on the pedestrian terminal device 1 or on the mobile information terminal device 2, and pedestrian information such as identification information of the pedestrian terminal device 1 (pedestrian ID, MAC address, etc.).

Figure 2:
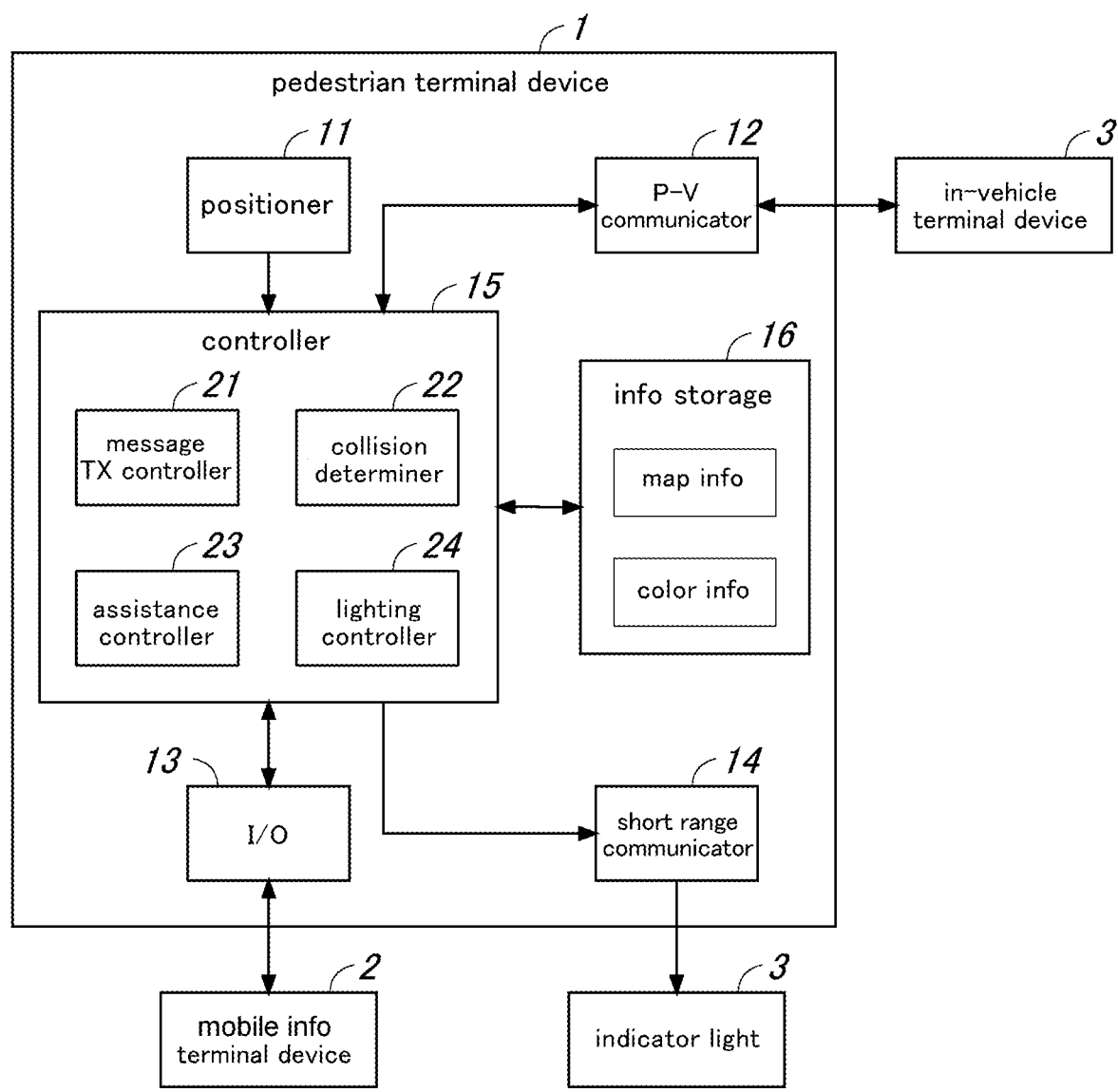
FIG. 2 is a block diagram showing a schematic configuration of a pedestrian terminal device 1.

Next, the schematic configuration of the pedestrian terminal device 1 will be described. FIG. 2 is a block diagram showing a schematic configuration of the pedestrian terminal device 1.

The pedestrian terminal device 1 includes a positioner (position information acquirer) 11, a pedestrian-vehicle communicator 12, an I/O section 13, a short range communicator 14, a controller 15, and an information storage 16.

The positioner 11 acquires position information of the device itself by a satellite positioning system such as GPS (Global Positioning System), QZSS (Quasi-Zenith Satellite System), or GLONASS (Global Navigation Satellite System). The position information or information on the position of the mobile device may be acquired using the positioning function of the mobile information terminal device 2.

The pedestrian-vehicle communicator 12 transmits and receives messages to/from the in-vehicle terminal device 4 via the pedestrian-vehicle communication. In this pedestrian-vehicle communication, wireless communication is performed using a frequency band adopted in a safe driver assistance wireless system utilizing an ITS.

The I/O section 13 exchanges information with the mobile information terminal device 2. The mobile information terminal device 2 performs an assist operation for the pedestrian based on the information provided from the I/O section 13.

The short range communicator 14 communicates with the indicator light 3 via short range communication such as Bluetooth (registered trademark). In the present embodiment, the short range communicator transmits information on the light color (e.g., red, yellow, or blue) and on lighting patterns (e.g., fast blinking, slow blinking, always-on) of the indicator light 3 to the indicator light 3, and the indicator light 3 operates based on the information.

The information storage 16 stores map information, information on the light color of the indicator light 3, a program(s) executed by the controller 15, and other information. The system may be configured such that the information storage 16 acquires the map information from the mobile information terminal device 2.

The controller 15 includes a message transmission controller 21, a collision determiner 22, an assistance controller 23, and a turn-on controller 24. The controller 15 is comprised primarily of a processor, and each functional unit of the controller 15 is implemented by causing the processor to execute a program(s) stored in the information storage 16.

The message transmission controller 21 controls transmission of messages by the pedestrian-vehicle communicator 12. Specifically, the message transmission controller determines, based on the pedestrian position information, whether or not a situation occurs in which the pedestrian information (pedestrian ID and position information, or other information) is required to be transmitted. When determining that the pedestrian information is required to be transmitted, the message transmission controller generates a message including the pedestrian information and causes the pedestrian-vehicle communicator 12 to transmit the message. In determining whether or not to transmit the massage, the message transmission controller determines whether or not the pedestrian information is required to be transmitted to the in-vehicle terminal device 4 so as to notify the in-vehicle terminal device 4 of the presence of the pedestrian, more specifically, the message transmission controller determines whether or not a pedestrian has entered a prescribed dangerous area such as an intersection.

The collision determiner 22 obtains pedestrian speed information and pedestrian orientation information associated with the pedestrian based on how the pedestrian position information acquired by the positioner 11 changes, and determines whether or not the pedestrian has a collision risk with a vehicle based on the pedestrian position information, the speed information and the orientation information, as well as vehicle position information, vehicle speed information and vehicle orientation information provided from the in-vehicle terminal device 4. In some embodiments, the collision risk may be determined in consideration of the map information.

Moreover, the collision determiner 22 determines one assistance level from the multiple assistance levels depending on the collision risk. In this assistance level determination, the collision determiner calculates a predicted collision time; that is, the time until the pedestrian collides with the vehicle from the present time based on the speeds and the directions of and the distance between the pedestrian and the vehicle, and compares the predicted collision time with two thresholds to determine which one of three assistance levels (Warn, Alert, Provision of information). Specifically, when the predicted collision time is less than a first threshold (e.g., 2 seconds); that is, when the collision risk is high, the collision determiner determines the assistance level to be Warn, when the predicted collision time is greater than or equal to the first threshold and less than a second threshold (e.g., 5 seconds); that is, when the collision risk is moderate, the collision determiner determines the assistance level to be Alert, and when the predicted collision time is greater than the second threshold (e.g., 5 seconds); that is the collision risk is low, the collision determiner determines the assistance level to be Provision of information.

The assistance controller 23 controls the assist operation for the pedestrian based on the assistance level (Warn, Alert, Provision of information) determined by the collision determiner 22. In the assist operation for the pedestrian, the assistance controller, according to the assistance level, causes a speaker provided on the mobile information terminal device 2 to output a warning sound or a warning voice announcement, or causes a vibrator provided on the mobile information terminal device 2 to vibrate.

The turn-on controller 24 controls turning on and off of the indicator light 3. In the present embodiment, the turn-on controller turns on the indicator light 3 based on the turn-on instruction information transmitted from the in-vehicle terminal device 4. In this case, the turn-on controller turns on the indicator light 3 in a light color designated by the turn-on instruction information, and changes the turn-on pattern of the indicator light 3 according to the assistance level determined by the collision determiner 22. When receiving multiple pieces of the turn-on instruction information from the multiple in-vehicle terminal devices 4, the turn-on controller determines the light color based on one of those pieces of the turn-on instruction information chosen with priority given to that transmitted from the in-vehicle terminal device 4 of the vehicle having a highest collision risk.

Figure 3:
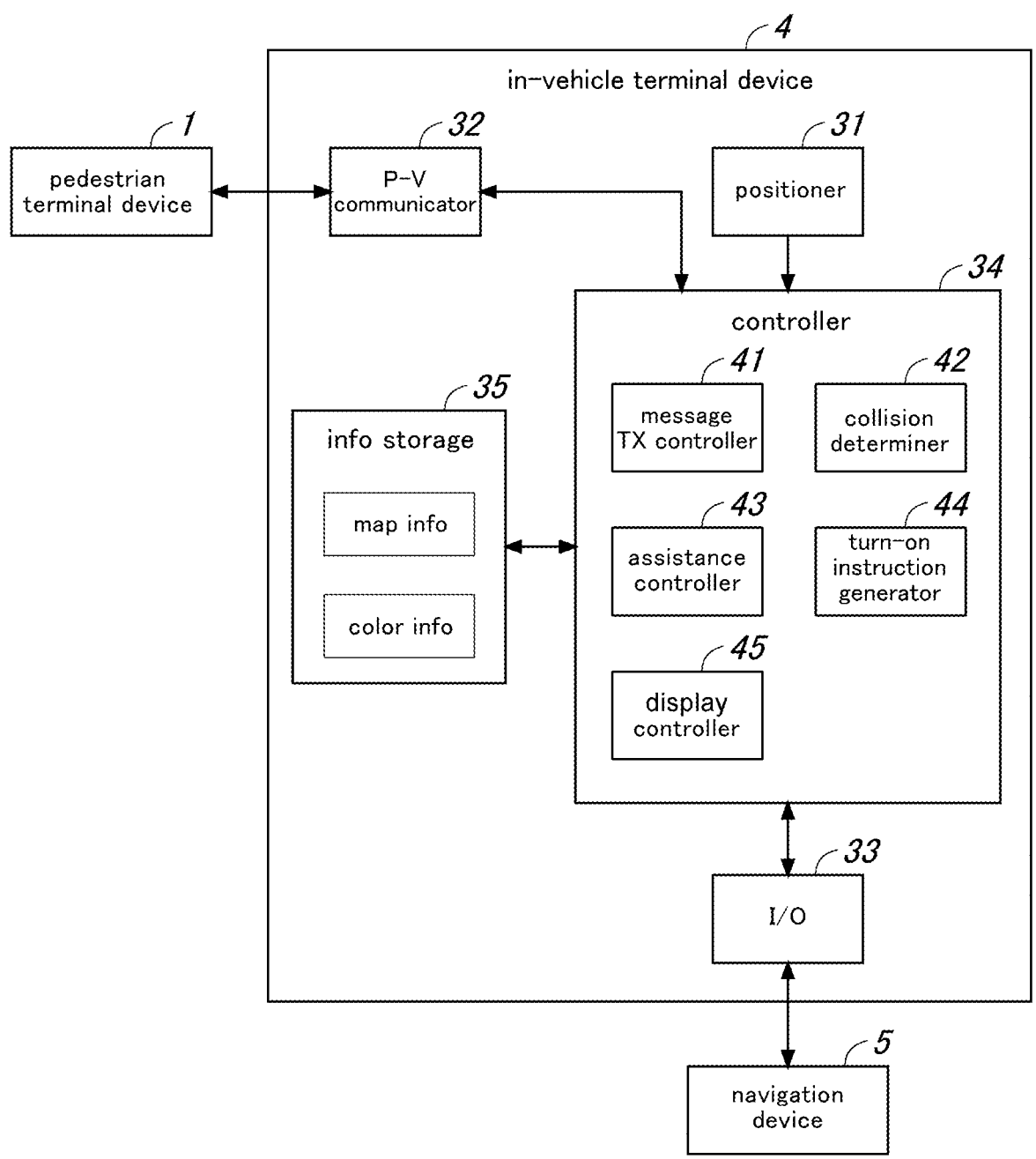
FIG. 3 is a block diagram showing a schematic configuration of an in-vehicle terminal device 4.

Next, the schematic configuration of the in-vehicle terminal device 4 will be described. FIG. 3 is a block diagram showing a schematic configuration of the in-vehicle terminal device 4.

The in-vehicle terminal device 4 includes a positioner (position information acquirer) 31, a pedestrian-vehicle communicator 32, an I/O section 33, a controller 34, and an information storage 35.

The positioner 31 acquires position information of the device itself by a satellite positioning system in the same manner as the positioner 11 of the pedestrian terminal device 1. The position information of the device itself may be acquired using the positioning function of the navigation device 5.

The pedestrian-vehicle communicator 32 transmits and receives messages to/from the pedestrian terminal device 1 via the pedestrian-vehicle communication. In this pedestrian-vehicle communication, wireless communication is performed using a frequency band adopted in a safe driver assistance wireless system utilizing an ITS in the same manner as the pedestrian-vehicle communicator 12 of the pedestrian terminal device 1.

The I/O section 33 exchanges information with the navigation device 5. The navigation device 5 performs the assist operation for the driver based on the information provided from the I/O section 33.

The information storage 35 stores map information, a program(s) executed by the controller 34, and other information. The system may be configured such that the information storage 35 acquires the map information from the navigation device 5.

The controller 34 includes a message transmission controller 41, a collision determiner 42, an assistance controller 43, a turn-on instruction generator 44, and a display controller 45. The controller 34 is comprised primarily of a processor, and the functional units of the controller 34 are implemented by causing the processor to execute a program(s) stored in the information storage 35.

The message transmission controller 41 controls transmission of a message by the pedestrian-vehicle communicator 32. In the present embodiment, the message transmission controller generates a message including the pedestrian information and the turn-on instruction information generated by the turn-on instruction generator 44, and causes the pedestrian-vehicle communicator 32 to transmit the message.

The collision determiner 42 obtains vehicle speed information and vehicle orientation information associated with the vehicle based on how the vehicle position information acquired by the positioner 11 changes, and determines whether or not the vehicle has a collision risk with a pedestrian based on the vehicle position information, the vehicle speed information and the vehicle orientation information, as well as the pedestrian position information, the pedestrian speed information and the pedestrian orientation information provided from the pedestrian terminal device 1. In some embodiments, the collision determiner 42 determines one of the multiple assistance levels (Warn, Alert, Provision of information) according to the collision risk in the same manner as the collision determiner 22 of the pedestrian terminal device 1.

The assistance controller 43 controls the assist operation for the pedestrian based on the assistance level (Warn, Alert, Provision of information) determined by the collision determiner 42. In the assist operation for the driver, the assistance controller, according to the assistance level, causes a speaker provided on the navigation device 5 to output a warning sound or a warning voice announcement, or causes the navigation device 5 to display warning words on its display screen.

The turn-on instruction generator 44 generates turn-on instruction information, which causes the indicator light 3 carried by the pedestrian who is determined to have a collision risk by the collision determiner 42 to be turned on. A message including the turn-on instruction information is transmitted from the pedestrian-vehicle communicator 32 to the pedestrian terminal device 1.

The display controller 45 displays an image of a pedestrian mark (indication image representing the position of the pedestrian) superimposed on a map image on the display screen of the navigation device 5. The display controller causes the display device to display the pedestrian mark in the same color as the light color of the indicator light of the pedestrian.

Figure 4:
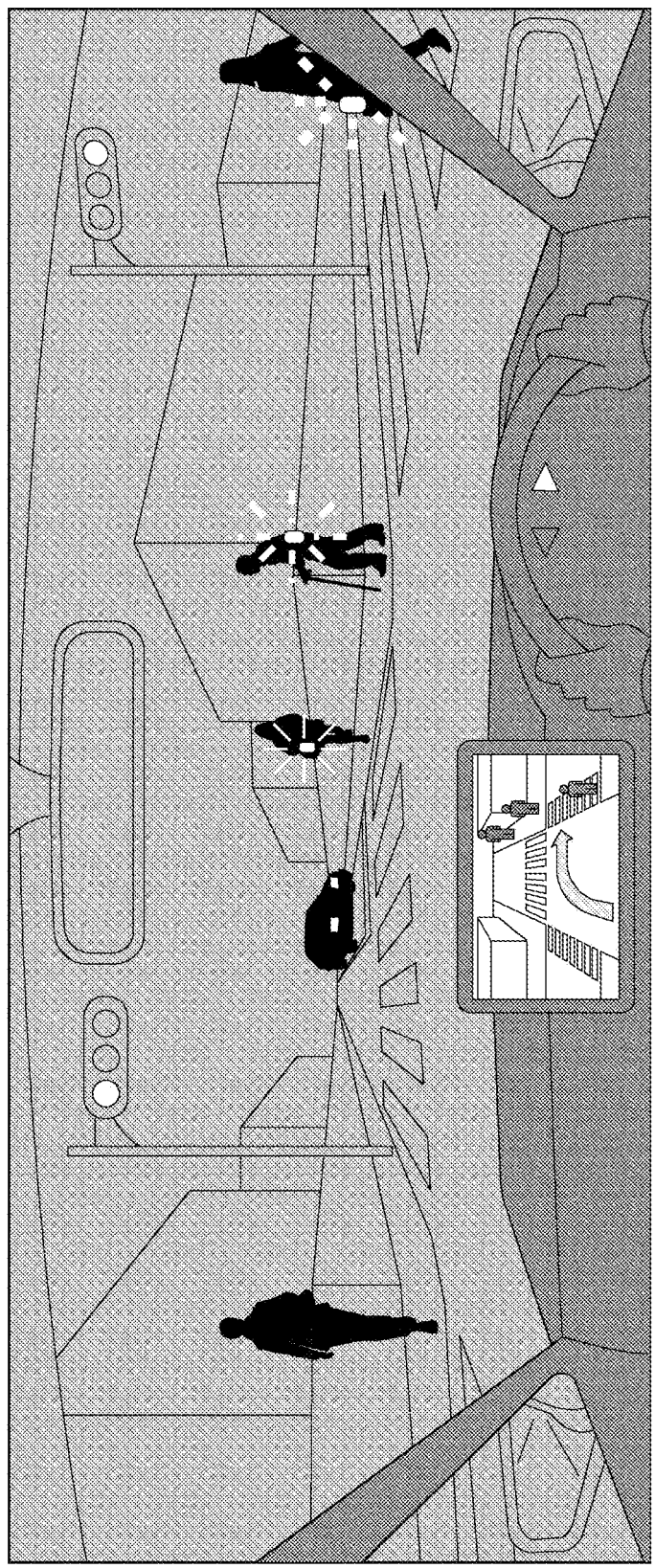
FIG. 4 is an explanatory view showing a situation regarding how indicator lights 3 of pedestrians are turned on viewed from a vehicle interior.
Figure 5:
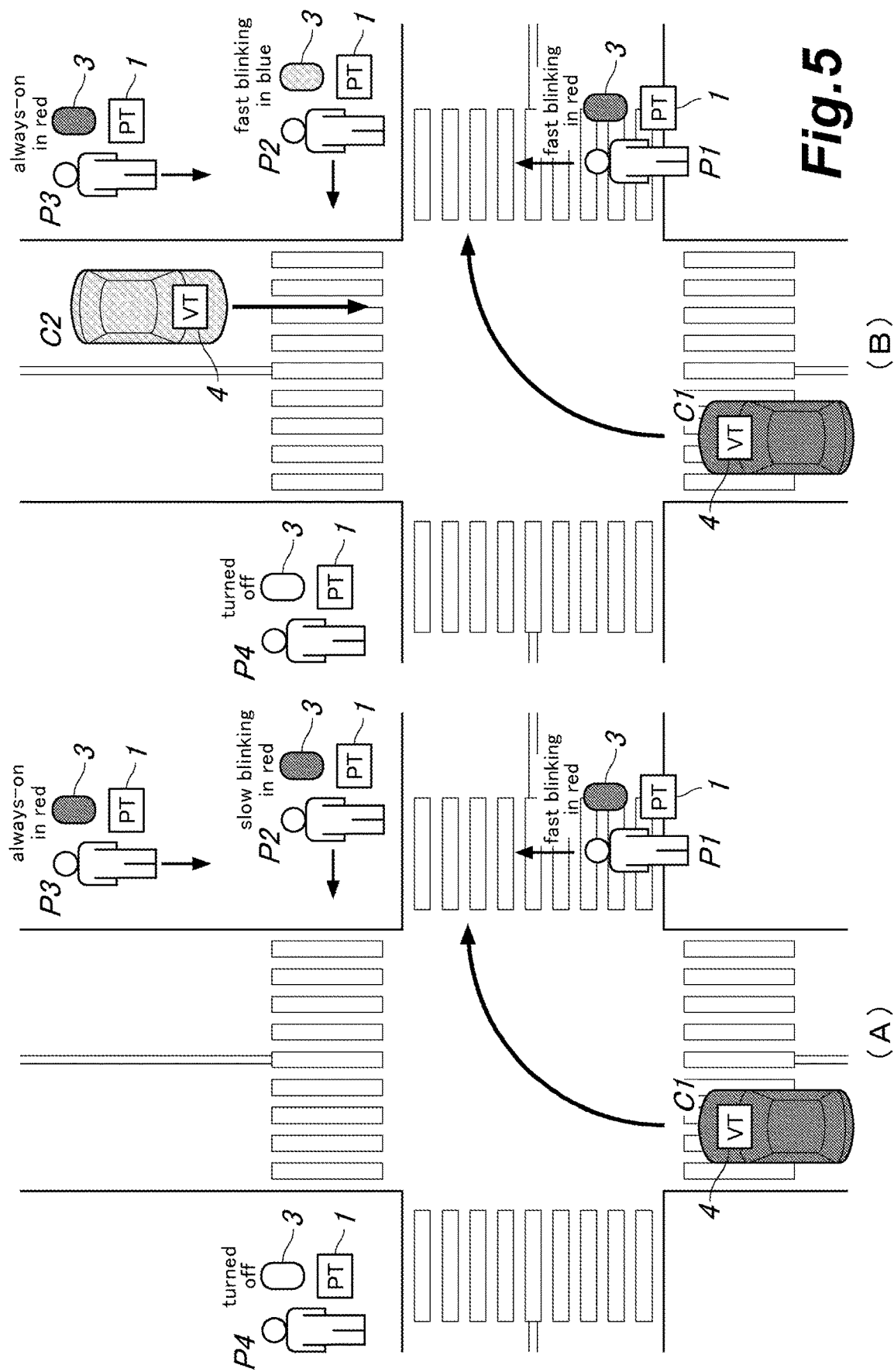

Next, some situations regarding how the indicator lights 3 of the pedestrians are turned on will be described. FIG. 4 is an explanatory view showing a situation regarding how the indicator lights 3 of pedestrians are turned on viewed from a vehicle interior. FIG. 5 is an explanatory view showing other situations regarding how the indicator lights 3 of pedestrians are turned on.

In the present embodiment, the in-vehicle terminal device 4 determines whether or not the vehicle itself has a collision risk with a pedestrian. When the vehicle has a collision risk with a pedestrian, control is made to turn on the indicator light 3 of the pedestrian with which the vehicle has the collision risk.

An example shown in FIG. 4 is a case where a vehicle makes a right turn at an intersection at night. As shown in the figure, although recognizing pedestrians by eyes becomes difficult during night time, turning on the indicator lights 3 of the pedestrians allows the driver to quickly recognize that the pedestrians are present. In particular, in the present embodiment, the indicator lights 3 of the pedestrians with which the vehicle has collision risks are turned on, whereas the indicator light 3 of the pedestrian with which the vehicle has no collision risk is not turned on. Thus, the driver can instantly recognize only the pedestrians having collision risks with the own vehicle.

As shown in FIG. 5(A), the in-vehicle terminal device 4 makes a collision determination to determine collision risks of pedestrians nearby with the own vehicle, and if a pedestrian having a collision risk with the vehicle is present, the in-vehicle terminal device instructs the pedestrian terminal device 1 of the pedestrian with the collision risk to turn on the indicator lights 3. As a result, the indicator lights 3 of the pedestrians having collision risks with the own vehicle are turned on, so that the driver of the vehicle can recognize the pedestrians having collision risks with the vehicle.

The in-vehicle terminal device 4 holds in advance color information on a light color specific to the vehicle itself, and instructs the pedestrian terminal device 1 to turn on the indicator lights 3 in the light color specific to the vehicle. For this reason, the indicator lights 3 of the pedestrians having collision risks with the single vehicle are turned on in the same light color. The color information on a light color specific to each vehicle may be set in advance by the driver via the navigation device 5 and may be set based on, for example, the color of each vehicle body.

In addition, in the present embodiment, the turn-on pattern of each indicator light 3 is changed according to the assistance level set based on the collision determination. Specifically, when the assistance level is Warn, an indicator light is controlled to blink fast; that is, the turn-on pattern is set to be fast blinking with a short blink cycle, when the assistance level is Alert, an indicator light is controlled to blink slowly; that is, the turn-on pattern is set to be slow blinking with an longer blink cycle, and when the assistance level is Provision of information, the turn-on pattern of an indicator light is maintained turned on.

In an example shown in FIG. 5(A), a vehicle C1, which makes a right turn, has collision risks with pedestrians P1, P2, and P3, and depending on the degree of danger or risk, the assistance level of the pedestrian P1 is set to be Warn, the assistance level of the pedestrian P2 is set to be Alert, and the assistance level of the pedestrian P3 is set to be Provision of information. In addition, the light color specific to the vehicle C1 is red in this embodiment.

In this case, the in-vehicle terminal device 4 of the vehicle C1 transmits a turn-on instruction to blink fast in red to the pedestrian terminal device 1 in the pedestrian P1, so that the indicator light 3 in the pedestrian P1 blinks fast in red. The in-vehicle terminal device of the vehicle C1 also transmits a tune-on instruction to blink slowly in red to the pedestrian terminal device 1 of the pedestrian P2, so that the indicator light 3 of the pedestrian P2 blinks slowly in red. In addition, the in-vehicle terminal device of the vehicle C1 transmits a turn-on instruction to continuously turn on in red to the pedestrian terminal device 1 of the pedestrian P3, so that the indicator light 3 of the pedestrian P3 is maintained turned on in red. Since the pedestrian P4 has no collision risk with the vehicle C1, the indicator light 3 of the pedestrian P4 remains turned off.

When there are multiple vehicles in the vicinity, each pedestrian can have different collision risks with different vehicles. Also, even when multiple vehicles have collision risks with pedestrians, each pedestrian has different assistance levels for the different vehicles. For this reason, in the pedestrian terminal device 1, conflicts can occur between turn-on instructions from the multiple in-vehicle terminal devices 4. Thus, in the present embodiment, when receiving turn-on instructions from the multiple in-vehicle terminal devices 4, the pedestrian terminal device compares the assistance levels from the in-vehicle terminal devices with one another, and sets the light color and the turn-on pattern based on the turn-on instruction information chosen with priority given to that from the in-vehicle terminal device of the vehicle having the highest collision risk represented by the assistance level.

In the example shown in FIG. 5(B), since the pedestrian P2 travels in the direction of the road, the vehicle C2 going straight down should have a high collision risk with the pedestrian P2 and the assistance level for the vehicle C2 is set to be Warn. In this case, when the color specific to the vehicle C2 is blue, the in-vehicle terminal device 4 of the vehicle C2 transmits turn-on instructions to blink fast in blue to the pedestrian terminal device 1 of the pedestrian P2. Meanwhile, since the assistance level of the vehicle C1 of the pedestrian P2 is set to be Alert and the vehicle C2 has a higher collision risk, priority is given to the turn-on instructions from the in-vehicle terminal device 4 of the vehicle C2 and the indicator light 3 of the pedestrian P2 blinks fast in blue.

Next, the display screen of the navigation device 5 will be described. FIG. 6 is an explanatory view showing images displayed on the display screen of the navigation device 5.

The display screen of the navigation device 5 displays assistance images for the driver of the vehicle according to the assistance level determined based on the collision determination. In the example of FIG. 6, the images displayed in the display screen include the words "Caution—Pedestrian Near Crossing in Right Turn Path."

The images displayed in the display screen of the navigation device 5 include pedestrian marks 52 at the positions of pedestrians in a map image 51. The pedestrian marks 52 represent only the pedestrians having collision risks with the vehicle and are displayed in the same color as the light color of the indicator lights 3. Moreover, each pedestrian mark 52 is displayed in a display pattern determined according to the degree of collision risk, as in the case of the indicator light 3. That is, when the assistance level is Warn, the mark blinks fast, when the assistance level is Alert, the mark blinks slowly, and when the assistance level is Provision of information, the mark is maintained turned on.

Under the conditions, when a pedestrian having a collision risk with the vehicle is present, the navigation device 5 performs an assist operation for the driver, e.g. serving voice announcement or image displayed on the display screen. In response to the assist operation, the driver attempts to confirm the position of the pedestrian which is actually present ahead of the vehicle. In this situation, the driver can check the pedestrian mark 52 displayed on the display screen of the navigation device 5 so as to grasp an area in which the pedestrian is actually present to thereby find the blinking indicator light 3 in the area. As a result, the time required for the driver to grasp the position of the pedestrian becomes short, which means that the driver can quickly grasp the actual position of the pedestrian.

In particular, in the present embodiment, the pedestrian mark 52 is displayed on the display screen of the navigation device 5 in the same display mode as the light color and the turn-on pattern of the indicator light 3 of each pedestrian. Thus, the driver can easily recognize pedestrians present nearby and instantly grasp the degree of a collision risk for each pedestrian.

FIG. 6(A) shows an image displayed on the display screen of the navigation device 5 of the vehicle C1 in the case that a single vehicle is present as shown in FIG. 5(A). In this case, the pedestrian mark 52 is displayed on the display screen of the navigation device 5 of the vehicle C1 in the same display mode as the indicator light 3 of the pedestrian. That is, the pedestrian mark 52 of the pedestrian P1 blinks fast in red, the pedestrian mark 52 of the pedestrian P2 blinks slowly in the red, and the pedestrian mark 52 of the pedestrian P3 is maintained turned on in red.

FIG. 6(B) shows an image displayed on the display screen of the navigation device 5 of the vehicle C1 in the case that multiple vehicles are present nearby as shown in FIG. 5(B). In this case, the assistance level of the vehicle C2 is Warn, and since the vehicle C2 has a higher collision risk than the vehicle C1, the pedestrian mark 52 of the pedestrian P2 blinks fast in blue, which color is specific to the vehicle C2. In this situation, since the color specific to the vehicle C1 is red, the driver of the vehicle C1 can recognize that the pedestrian mark 52 of the pedestrian P2 displayed in blue is not displayed based on the collision risk with the own vehicle.

When conflicts occur between the turn-on instructions from multiple in-vehicle terminal devices 4 and the turn-on instructions from the vehicle having a highest collision risk is used, the in-vehicle terminal devices 4 in the remaining three vehicles do not know the light color of the actual indicator lights 3. Thus, in the present embodiment, when the indicator light 3 is turned on in a color different from that designed by the turn-on instructions, the light color which is actually adopted is notified to the in-vehicle terminal devices 4. In this way, the color of the pedestrian mark 52 displayed on the navigation device 5 matches the light color of the indicator light 3.

The pedestrian mark 52 may be displayed on the display screen of the navigation device 5 in the color specific to the own vehicle, regardless of the light color which is actually adopted. In this case, since the color of the pedestrian mark 52 displayed on the navigation device 5 does not match the actual light color of the indicator light 3, the navigation device 5 is preferably configured to display an image such as characters indicating that the indicator light 3 is turned on in the color designed by the instructions from the in-vehicle terminal device 4 of another vehicle.

Furthermore, when the color specific to one vehicle is the same as that specific to another vehicle, the driver cannot determine whether or not the displayed pedestrian mark 52 is associated with the collision risk with the own vehicle. In this case, the navigation device 5 is preferably configured to display an image such as characters indicating that the displayed pedestrian mark 52 has the color determined based on the collision risks associated with another vehicle on the display screen.

Figure 7:
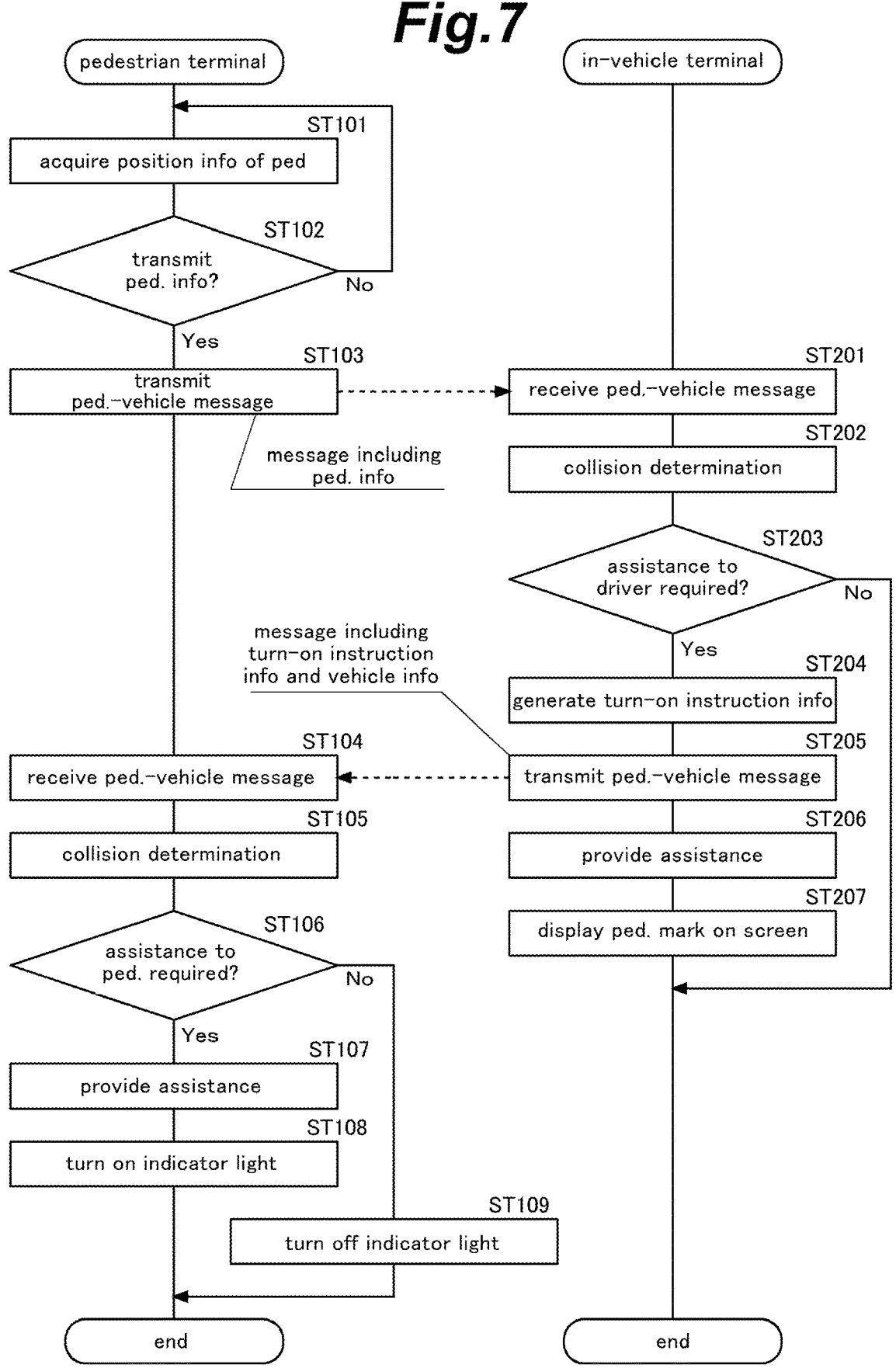
FIG. 7 is a flow chart showing operation procedures of a pedestrian terminal device 1 and an in-vehicle terminal device 4.

Next, operation procedures of the pedestrian terminal device 1 and the in-vehicle terminal device 4 will be described. FIG. 7 is a flow chart showing operation procedures of the pedestrian terminal device 1 and the in-vehicle terminal device 4.

In the pedestrian terminal device 1, first, the positioner 11 acquires pedestrian position information (ST 101). Next, the message transmission controller 21 determines whether or not to transmit the pedestrian information, more specifically, determines whether or not the pedestrian has entered the risky or dangerous area (ST 102). In the case where the pedestrian information is to be transmitted (Yes in ST 102), the pedestrian-vehicle communicator 12 transmits a message including the pedestrian information (pedestrian ID, location information, or other information) via the pedestrian-vehicle communication (ST 103).

In the in-vehicle terminal device 4, upon receiving the message transmitted from the pedestrian terminal device 1 (ST 201), the pedestrian-vehicle communicator 32 makes a collision determination to determine, based on the pedestrian position information and other information, whether or not the vehicle has a collision risk with a pedestrian (ST 202). Then, the assistance controller 43 determines, based on the determination result of the collision determiner 42, whether or not the navigation device needs to perform an assist operation for the driver (ST 203).

In the case where the assist operation for the driver is necessary (Yes in ST 203), the turn-on instruction generator 44 generates the turn-on instruction information to cause the indicator light 3 to be turned on in a light color which can be designated by the color information stored in the information storage 35 and is specific to the own vehicle (ST 204). Then, the pedestrian-vehicle communicator 32 transmits a message including the turn-on instruction information and the vehicle information (such as vehicle ID and position information) via the pedestrian-vehicle communication (ST 205).

The assistance controller 43 performs the assist operation for the driver (ST 206). In the assist operation for this driver, the assistance controller controls the assist operation based on the assistance level (Warn, Alert, Provision of information) so as to cause the navigation device to output a warning sound or a warning voice announcement, or cause the navigation device to display warning words on its display screen.

The display controller 45 displays the pedestrian mark 52 on the display screen of the navigation device 5. The pedestrian mark 52 is displayed in the same color as that designed by the turn-on instruction information; that is, the color specific to the own vehicle. In addition, the pedestrian mark 52 is displayed in a display pattern (fast blinking, slow blinking, or always-on) determined based on the assistance level (Warn, Alert, Provision of information).

In the pedestrian terminal device 1, when the pedestrian-vehicle communicator 12 receives the message transmitted from the in-vehicle terminal device 4 (ST 104), the collision determiner 22 makes a collision determination to determine whether or not the pedestrian has a collision risk with a vehicle based on the vehicle position information or other information included in the message (ST 105). Then, based on the determination result of the collision determiner 42, the assistance controller 23 determines whether or not an assist operation is necessary for the pedestrian (ST 106).

In the case where the assist operation is necessary for the pedestrian (Yes in ST 106), the assistance controller 23 performs the assist operation for the pedestrian (ST 107). In the assist operation for the pedestrian, the assistance controller, according to the assistance level (Warn, Alert, and Provision of information), causes the mobile information terminal device to output a warning sound or a warning voice announcement, or causes a vibrator provided on the mobile information terminal device to vibrate.

Furthermore, the turn-on controller 24 turns on the indicator light 3 based on the turn-on instruction information included in the message (ST 108). In this situation, the turn-on controller turns on the indicator light 3 in a turn-on pattern (Fast blinking, Slow blinking, Always-on) according to the assistance level (Warn, Alert, or Provision of information). When receiving multiple pieces of the turn-on instruction information from the multiple in-vehicle terminal devices 4, the turn-on controller gives priority to the turn-on instruction information transmitted from the in-vehicle terminal device 4 of the vehicle having the highest collision risk to choose the turn-on instruction information on which the light color is determined. When the assist operation is not necessary (No in ST 106), the turn-on controller turns off the indicator light 3 (ST 109).

Second Embodiment

Figure 8:
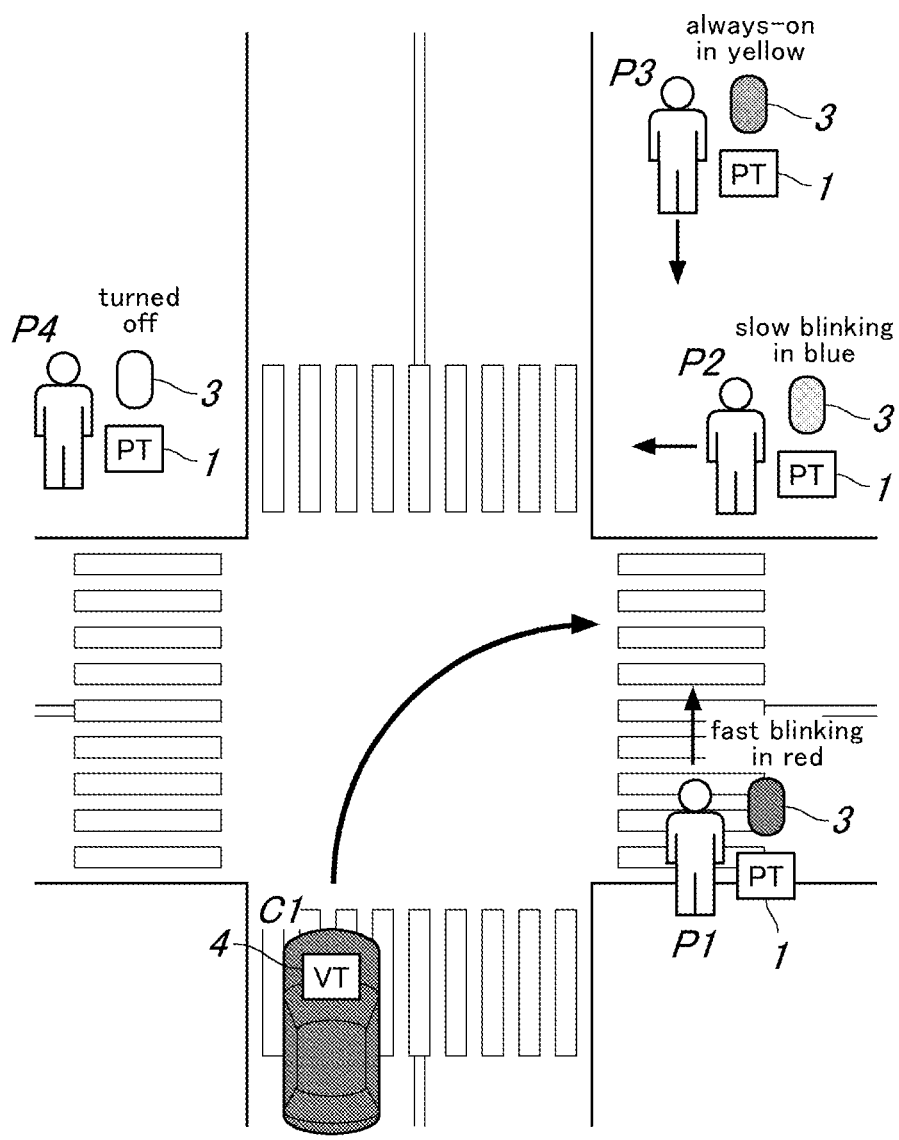
FIG. 8 is an explanatory view showing a situation regarding how indicator lights 3 of pedestrians are turned on in a system according to a second embodiment of the present invention.

Next, a second embodiment of the present invention will be described. FIG. 8 is an explanatory view showing a situation regarding how indicator lights 3 of pedestrians are turned on in a system according to a second embodiment of the present invention. Except for what will be discussed here, the configuration of the present embodiment is the same as that of the first embodiment.

In the present embodiment, the in-vehicle terminal device 4 instructs the pedestrian terminal device 1 to turn on the indicator light 3 in the same manner as in the first embodiment. However, in the second embodiment, different light colors are assigned to pedestrians so that the indicator lights 3 of the pedestrians are turned on in respective different colors.

In the present embodiment, the turn-on pattern of the indicator light 3 is changed according to the assistance level (collision risk level) in the same manner as in the first embodiment. For example, when the assistance level is Warn, the indicator light is controlled to blink fast, when the assistance level is Alert, the indicator light is controlled to blink slowly, and when the assistance level is Provision of information, the indicator light is controlled to be maintained turned on.

In the example shown in FIG. 8, the vehicle C1, which is to make a right turn, has collision risks with the pedestrian P1, P2 and P3, and the assistance levels for the pedestrians P1, P2, and P3 are Warn, Alert, and Provision of information, respectively. In addition, the pedestrian P1 is assigned a red color, the pedestrian P2 is assigned a blue color, and the pedestrian P3 is assigned a yellow color.

In this case, the in-vehicle terminal device 4 of the vehicle C1 transmits turn-on instruction information to instruct the indicator light to blink fast in red to the pedestrian terminal device 1 of the pedestrian P1 so that the indicator light 3 of the pedestrian P1 blinks fast in red. The in-vehicle terminal device transmits turn-on instruction information to instruct the indicator light to blink slowly in blue to the pedestrian terminal device 1 of the pedestrian P2 so that the indicator light 3 of the pedestrian P2 blinks slowly in blue. The in-vehicle terminal device transmits turn-on instruction information to instruct the indicator light to be maintained turned on so that the indicator light 3 of the pedestrian P3 is maintained turned on in yellow.

In cases where there are multiple vehicles in the vicinity, when the in-vehicle terminal device 4 of each vehicle issues turn-on instructions, in the pedestrian terminal device 1, conflicts can occur between turn-on instructions from multiple in-vehicle terminal devices 4. Therefore, in the present embodiment, for a pedestrian(s) to which a color has already been assigned by the turn-on instructions from the in-vehicle terminal device 4, priority is given to the already assigned color, and for the nearby pedestrians to which any colors have not yet been assigned, the in-vehicle terminal device 4 assigns a color to each of those pedestrians.

When a pedestrian with an assigned color becomes to have no collision risk with the vehicle and its indicator light 3 is turned off, the state of the pedestrian is reset such that the pedestrian has no assigned color.

When there are multiple vehicles in the vicinity, each pedestrian has different collision risks with the respective vehicles. Also, even when multiple vehicles have collisions risks with pedestrians, each pedestrian has different assistance levels for the respective vehicle. Thus, in the present embodiment, when receiving turn-on instructions from multiple in-vehicle terminal devices 4, the pedestrian terminal device compares the assistance levels from their in-vehicle terminal devices with one another, and sets the turn-on pattern (fast blinking, slow blinking, or always-on) based on the turn-on instruction information chosen with priority given to that from the in-vehicle terminal device of the vehicle having the highest collision risk represented by the assistance level.

Figure 9:
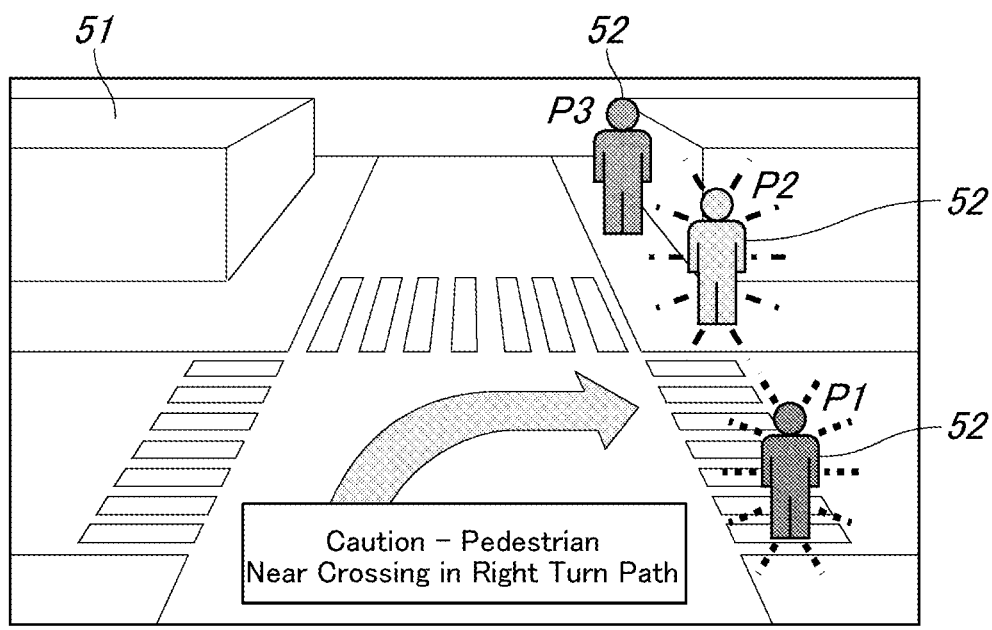
FIG. 9 is an explanatory view showing an image displayed on a display screen of a navigation device 5.

Next, the display screen of the navigation device 5 will be described. FIG. 9 is an explanatory view showing an image displayed on the display screen of the navigation device 5.

The display screen of the navigation device 5 displays assistance images for the driver of the vehicle according to the assistance level determined based on the collision determination in the same manner as the first embodiment. In the example of FIG. 9, the images displayed in the display screen include the words "Caution—Pedestrian Near Crossing in Right Turn Path."

The images displayed in the display screen of the navigation device 5 include pedestrian marks 52 at the positions of pedestrians with which the vehicle has collision risks in a map image 51. By having a pedestrian terminal device 1 notify the in-vehicle terminal device 4 of the color of the actual turned-on light of the pedestrian terminal device 1, each pedestrian mark 52 can be displayed in the same color as that of the light from a corresponding indicator light 3. In the example shown in FIG. 9, the pedestrian mark 52 of the pedestrian P1 blinks fast in red, the pedestrian mark 52 of the pedestrian P2 blinks slowly in blue, and the pedestrian mark 52 of the pedestrian P3 is maintained turned on in yellow.

In the present embodiment, from the pedestrian terminal device 1 of the pedestrian to which a color has already been assigned, the assigned color is notified to the in-vehicle terminal device 4. In addition, since the in-vehicle terminal device 4 assigns colors only to pedestrians to which any colors have not yet been assigned, it is ensured that each of the colors of the pedestrian marks 52 displayed on the navigation device 5 matches the light color of a corresponding indicator light 3.

Figure 10:
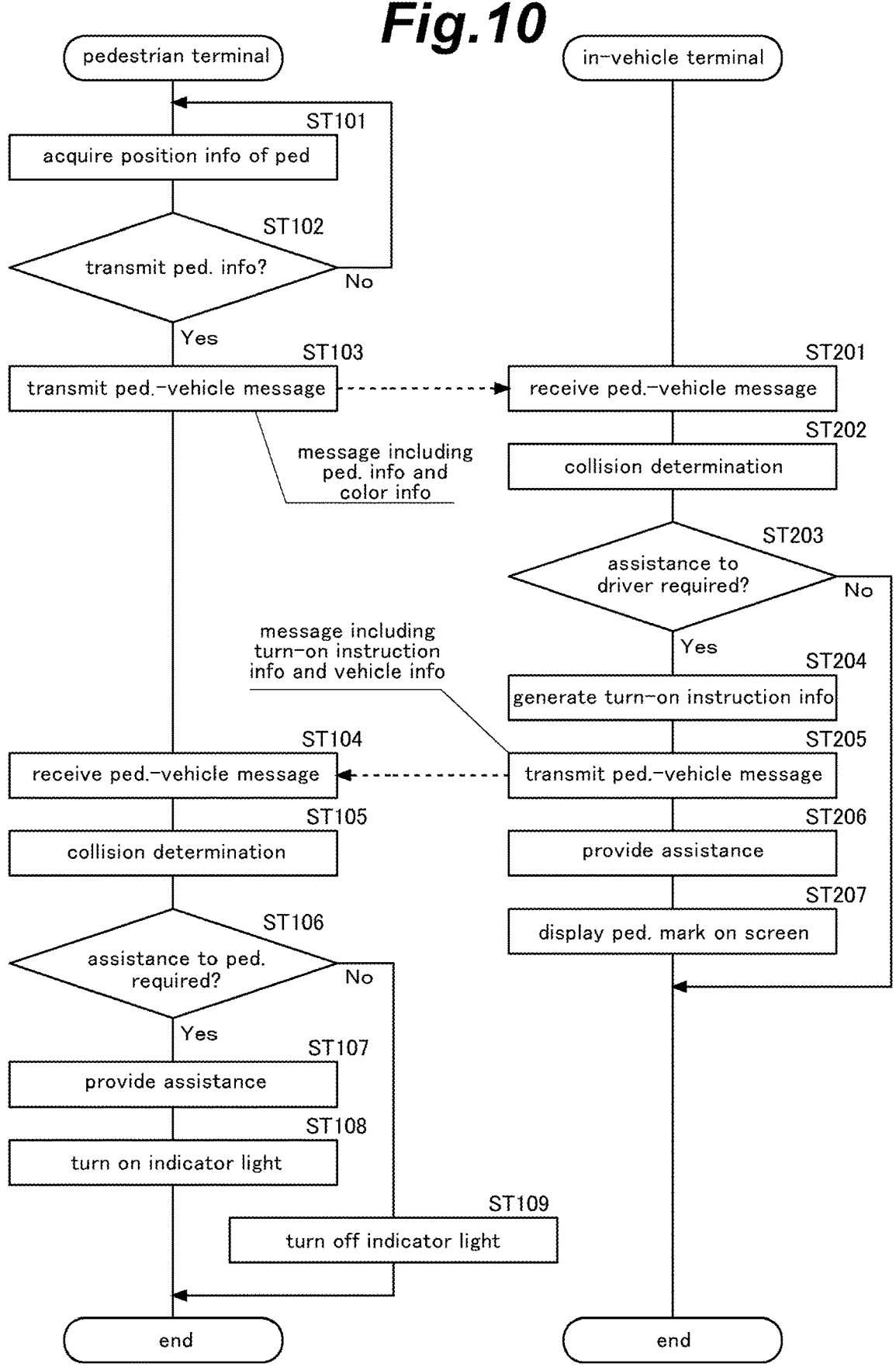
FIG. 10 is a flow chart showing operation procedures of a pedestrian terminal device 1 and an in-vehicle terminal device 4.

Next, operation procedures of the pedestrian terminal device 1 and the in-vehicle terminal device 4 will be described. FIG. 10 is a flow chart showing operation procedures of the pedestrian terminal device 1 and the in-vehicle terminal device 4.

In the present embodiment, the operation procedures of the pedestrian terminal device 1 and the in-vehicle terminal device 4 are generally similar to those shown FIG. 7, but different from those in FIG. 7 in that, in the present embodiment, when the pedestrian terminal device 1 transmits a message including pedestrian information via the pedestrian-vehicle communication (ST 103), if a color has already been assigned to the pedestrian terminal device, color information on the assigned light color is added to the message.

The operation procedures of the present embodiment are also different from those of the first embodiment in that, the in-vehicle terminal device 4 can generate turn-on instruction information (ST 204) such that the turn-on instruction information causes the indicator light 3 to be turned on in an assigned light color. If the message from the pedestrian terminal device 1 does not contain color information on an assigned light color, the in-vehicle terminal device 4 assigns a light color to the pedestrian, whereas if the message from the pedestrian terminal device 1 contains color information on an assigned light color, the in-vehicle terminal device 4 assigns a color different from the assigned light color to another pedestrian.

In some cases, the system may be configured such that the in-vehicle terminal device 4 assigns a light color to each pedestrian, regardless of whether or not a light color is already assigned to the pedestrian, and instructs the pedestrian to cause the indicator light to be turned on in the assigned color, and upon receiving the turn-in instructions from multiple in-vehicle terminal devices 4, the pedestrian terminal device sets the light color based on the turn-on instruction received at the earliest timing.

In the first embodiment, when a conflict occurs regarding the turn-on instructions, the pedestrian terminal device 1 chooses the light color based on the assistance level, and in the second embodiment, the in-vehicle terminal device 4 assigns a color to a pedestrian to which any color has not been assigned. However, conversely, in the configuration in which the indicator light 3 is turned on in a color specific to the vehicle as in the first embodiment, the in-vehicle terminal device 4 may assign a color to a pedestrian to which any color has not been assigned, or in the configuration in which indicator lights are turned on in respective different colors as in the second embodiment, the pedestrian terminal device 1 may choose the light color based on the assistance level.

Third Embodiment

Figure 11:
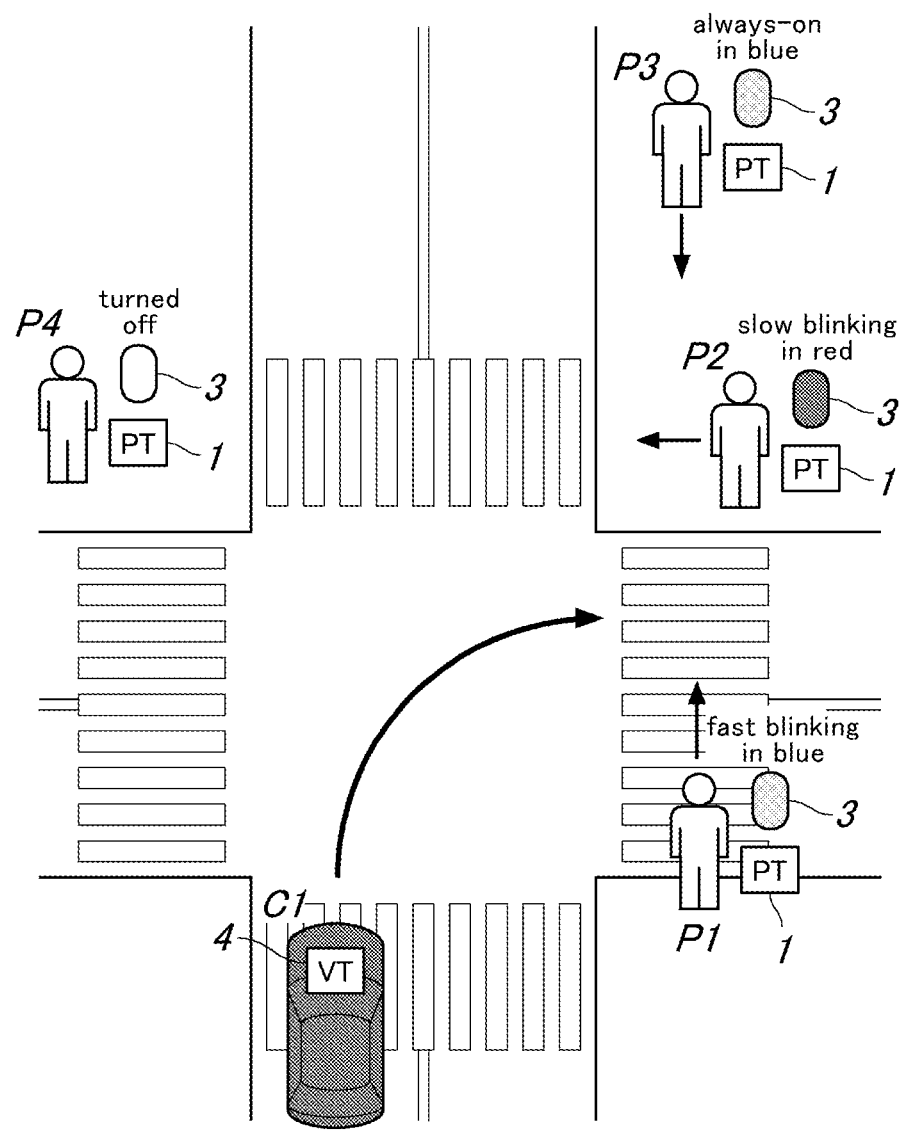
FIG. 11 is an explanatory view showing a situation regarding how indicator lights 3 of pedestrians are turned on in a system according to a third embodiment of the present invention.

Next, a third embodiment of the present invention will be described. FIG. 11 is an explanatory view showing a situation regarding how indicator lights 3 of pedestrians are turned on in a system according to a third embodiment of the present invention. Except for what will be discussed here, the configuration of the present embodiment is the same as that of the first embodiment.

While, in the first and second embodiments, the indicator light 3 of a pedestrian is turned on in a light color designated by the in-vehicle terminal device 4, in the present embodiment, the pedestrian terminal device 1 determines the light color of the indicator light 3 by itself. Particularly, in the present embodiment, the pedestrian terminal device 1 holds color information on the color specific to each pedestrian, and when having a collision risk with a vehicle, the pedestrian terminal device 1 turns on the indicator light 3 in a color specific to the pedestrian.

Furthermore, in the present embodiment, the light color of the indicator light specific to each pedestrian is set in advance; that is, the color specific to a pedestrian is set in advance for each user attribute. In particular, in the present embodiment, user attributes are classified according to the likelihood of taking a dangerous action. For example, a pedestrian who is likely to take a dangerous action, such as an elderly person or a child, is set to red, and a pedestrian with a low risk of taking dangerous actions is set to blue. In addition, a dedicated image may be displayed for a person who needs special considerations, such as a physically challenged person.

The user attribute may be set based on the past action history. Specifically, when a system is configured to detect pedestrians' dangerous actions such as entering a roadway and count the number of times a pedestrian has been taken such actions, the user attribute may be set based on the number of times the pedestrian has taken such dangerous actions.

In the present embodiment, the turn-on pattern of the indicator light 3 is changed according to the assistance level (collision risk level) in the same manner as the above-described embodiments. For example, when the assistance level is Warn, the indicator light is controlled to blink fast, when the assistance level is Alert, the indicator light is controlled to blink slowly, and when the assistance level is Provision of information, the indicator light is controlled to be maintained turned on.

In the example shown in FIG. 11, the vehicle C1, which is to make a right turn, has collision risks with the pedestrian P1, P2 and P3, and the assistance levels for the pedestrians P1, P2, and P3 are Warn, Alert, and Provision of information, respectively. The pedestrian P2 is an elderly person, who is likely to take dangerous actions, and thus, the pedestrian P1 is assigned a red color. As the pedestrians P1 and P3 are not elderly people or children and are less likely to take dangerous actions, the pedestrians P1 and P3 are assigned a blue color.

In this case, the indicator light 3 of the pedestrian P1 blinks fast in blue, the indicator light 3 of the pedestrian P2 blinks slowly in red, and the indicator light 3 of the pedestrian P3 is maintained turned on in blue.

When there are multiple vehicles in the vicinity, each pedestrian can have different collision risks with different vehicles. Also, even when multiple vehicles have collision risks with pedestrians, each pedestrian has respective different risks with the different vehicle. Thus, in the present embodiment, when multiple vehicles have collision risks with pedestrians, the pedestrian terminal device compares the assistance levels from in-vehicle terminal devices with one another, and sets the turn-on pattern (fast blinking, slow blinking, always-on) based on the turn-on instruction information chosen with priority given to that from the in-vehicle terminal device of the vehicle having the highest collision risk represented by the assistance level.

In the present embodiment, since the pedestrian light is turned on in a color specific to the pedestrian, no conflict occurs regarding the light color as in the above-described embodiments.

Figure 12:
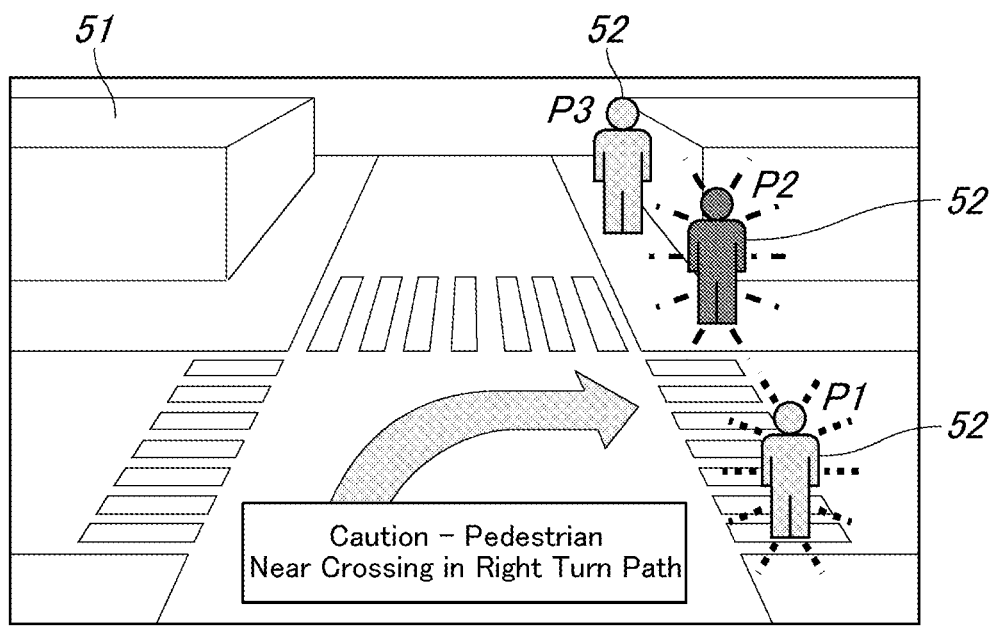
FIG. 12 is an explanatory view showing an image displayed on a display screen of a navigation device 5.

Next, the display screen of the navigation device 5 will be described. FIG. 12 is an explanatory view showing an image displayed on the display screen of the navigation device 5.

The display screen of the navigation device 5 displays assistance images for the driver of the vehicle according to the assistance level determined based on the collision determination in the same manner as the above-described embodiments. In the example of FIG. 12, the image displayed in the display screen includes the words "Caution— Pedestrian Near Crossing in Right Turn Path."

The image displayed in the display screen of the navigation device 5 includes pedestrian marks 52 at the positions of pedestrians with which the vehicle has collision risks in a map image 51 in the same manner as the above-described embodiments. By having a pedestrian terminal device 1 notify the in-vehicle terminal device 4 of the color specific to the pedestrian, each pedestrian mark 52 can be displayed in the same color as that of the light from a corresponding indicator light 3. In the example shown in FIG. 12, the pedestrian mark 52 of the pedestrian P1 blinks fast in blue, the pedestrian mark 52 of the pedestrian P2 blinks slowly in red, and the pedestrian mark 52 of the pedestrian P3 is maintained turned on in blue; that is, the marks are displayed in the same colors as the indicator lights 3 of the pedestrian P1, P2, and P3.

A traveling direction of each pedestrian may be indicated by an arrow displayed on the screen display of the navigation device 5. Such an arrow may be highlighted, e.g. by thickening the lines, to distinguishably indicate a pedestrian who is traveling fast such as a child riding a bicycle, or a pedestrian who is likely to take dangerous actions such as an elderly person or a child. Alternatively, the color or the line type (solid line, dotted line, etc.) of the arrow may be changed to display the arrow in a distinguishably different manner. Furthermore, based on the past action history regarding dangerous actions, a pedestrian mark for a pedestrian who has frequently taken dangerous actions may be displayed with a special mark (e.g. "x" or "!") or word (e.g. "caution") to indicate the caution us required.

Figure 13:
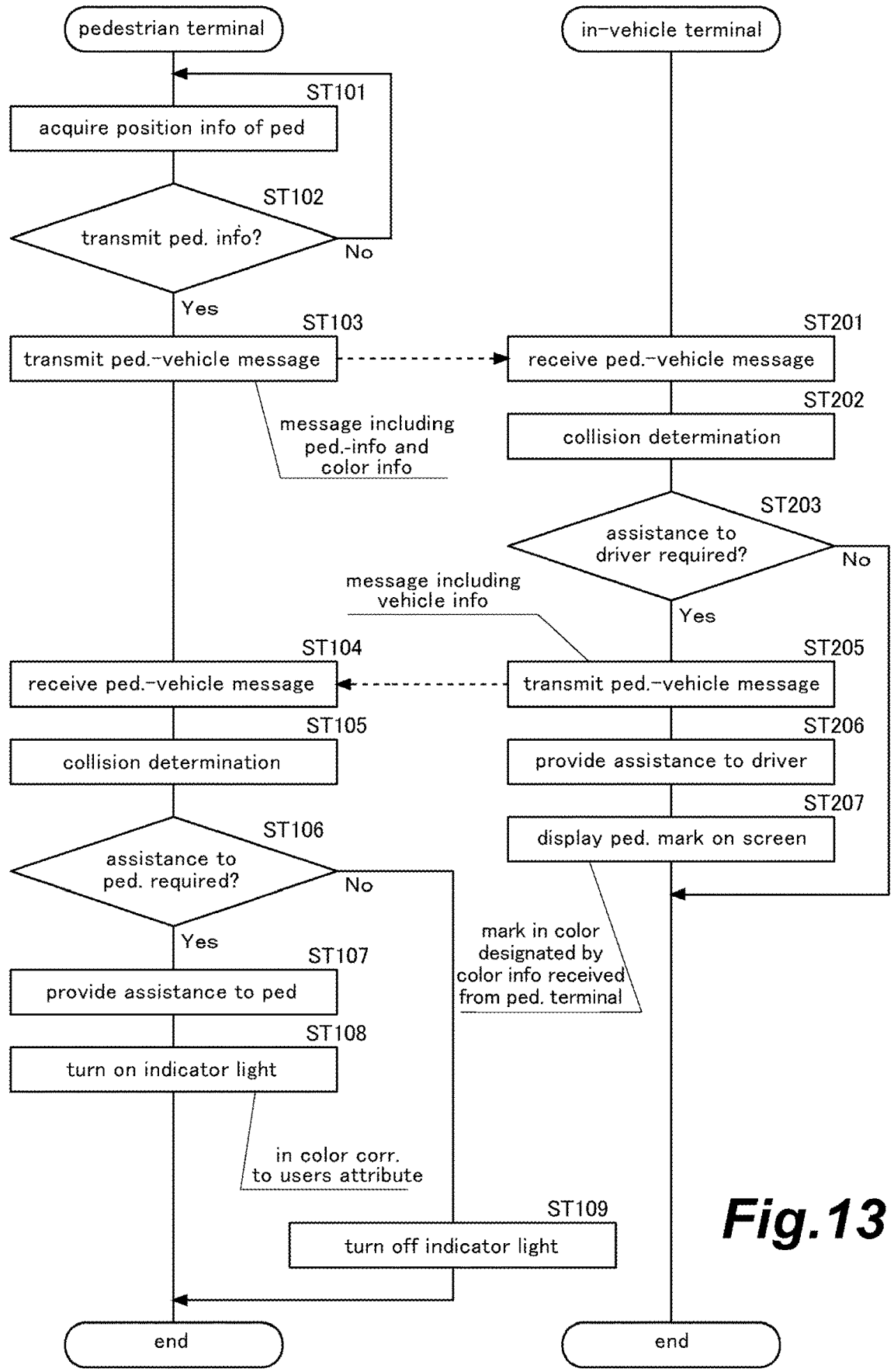
FIG. 13 is a flow chart showing operation procedures of a pedestrian terminal device 1 and an in-vehicle terminal device 4.

Next, operation procedures of the pedestrian terminal device 1 and the in-vehicle terminal device 4 will be described. FIG. 13 is a flow chart showing operation procedures of the pedestrian terminal device 1 and the in-vehicle terminal device 4.

In the present embodiment, the operation procedures of the pedestrian terminal device 1 and the in-vehicle terminal device 4 are generally similar to those shown FIG. 7, but different from those in FIG. 7 in that, in the present embodiment, when the pedestrian terminal device 1 transmits a message including pedestrian information via the pedestrian-vehicle communication (ST 103), color information on the color specific to a pedestrian, the color being set according to the user attribute, is added to the message.

The operation procedures of the present embodiment are also different from those of the above-described embodiments in that, when the in-vehicle terminal device 4 transmits the massage via the pedestrian-vehicle communication (ST 205), the message to be transmitted includes vehicle information (such as vehicle ID and position information), but does not include turn-on instruction information as in the above-described embodiments.

Furthermore, in the present embodiment, when the navigation device 5 in the in-vehicle terminal device 4 displays the pedestrian mark 52 on the display screen (ST 207), the pedestrian mark 52 is displayed with the same color as the light color of the indicator light 3 for each pedestrian based on color information included in the message transmitted from the pedestrian terminal device 1.

Moreover, in the present embodiment, when the pedestrian terminal device 1 turns on the indicator light 3 (ST 108), the indicator light 3 is turned on in a color specific to the pedestrian, the color being set according to the user attribute.

Fourth Embodiment

Figure 14:
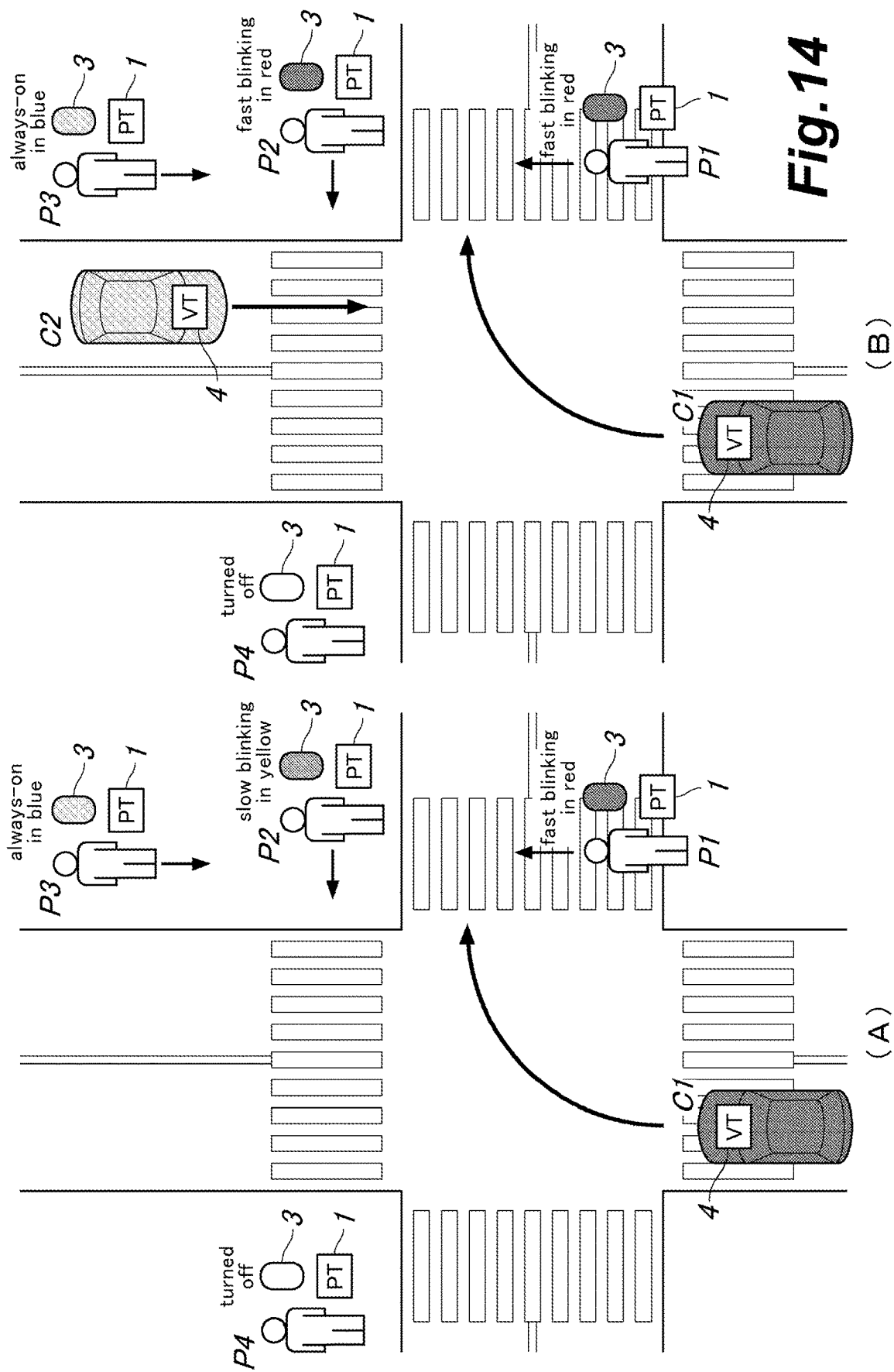
FIG. 14 is an explanatory view showing situations regarding how indicator lights 3 of pedestrians are turned on in a system according to a fourth embodiment of the present invention.

Next, a fourth embodiment of the present invention will be described. FIG. 14 is an explanatory view showing a situation regarding how indicator lights 3 of pedestrians are turned on in a system according to a fourth embodiment of the present invention. Except for what will be discussed here, the configuration of the present embodiment is the same as that of the first embodiment.

While, in the first and second embodiments, the indicator light 3 of a pedestrian is turned on in a light color designated by the in-vehicle terminal device 4, in the present embodiment, the pedestrian terminal device 1 determines the light color of the indicator light 3 by itself in the same manner as the third embodiment. Particularly, in the present embodiment, the pedestrian terminal device 1 changes the light color according to the assistance level determined based on the result of the collision determination. For example, when the assistance level is Warn, the color is set to red, and when the assistance level is the color is set to yellow, and when the assistance level is the color is set to blue.

Moreover, in the present embodiment, as in the above-described embodiments, a display pattern of the indicator light 3 (fast blinking, slow blinking, or always-on) is changed according to the assistance level. For example, when the assistance level is Warn, the display pattern is set to be fast blinking, when the assistance level is Alert, the display pattern is set to be slow blinking, and when the assistance level is Provision of information, the display pattern is set to be always-on.

In the example shown in FIG. 14(A), a vehicle C1, which makes a right turn, has collision risks with pedestrians P1, P2, and P3, and the assistance level of the pedestrian P1 is set to be Warn, the assistance level of the pedestrian P2 is set to be Alert, and the assistance level of the pedestrian P3 is set to be Provision of information. Thus, the indicator light 3 of the pedestrian P1 blinks fast in red, the indicator light 3 of the pedestrian P2 blinks slowly in yellow, and the indicator light 3 of the pedestrian P3 is maintained turned on in blue.

When there are multiple vehicles in the vicinity, each pedestrian can have different collision risks with different vehicles. Also, even when multiple vehicles have collision risks with pedestrians, each pedestrian has different assistance levels for the different vehicle. For this reason, conflicts can occur between the turn-on conditions (light color and turn-on pattern) of the indicator lights 3 of the pedestrians. Thus, in the present embodiment, when there are multiple vehicles in the vicinity, the pedestrian terminal device compares the assistance levels from in-vehicle terminal devices with one another, and sets the light color and the turn-on pattern based on the turn-on instruction information chosen with priority given to that from the in-vehicle terminal device of the vehicle having the highest collision risk represented by the assistance level.

In the example shown in FIG. 14(B), since the pedestrian P2 travels in the direction of the road, the vehicle C2 going straight down should have a high collision risk with the pedestrian P2 and the assistance level for the vehicle C2 is set to be Warn. Meanwhile, since the assistance level of the vehicle C1 of the pedestrian P2 set to be Alert and the vehicle C2 has a higher collision risk, priority is given to the turn-on instructions from the in-vehicle terminal device 4 of the vehicle C2 and the indicator light 3 of the pedestrian P2 blinks fast in red.

Next, the display screen of the navigation device 5 will be described. FIG. 15 is an explanatory view showing images displayed on the display screen of the navigation device 5.

The display screen of the navigation device 5 displays assistance images for the driver of the vehicle according to the assistance level determined based on the collision determination in the same manner as the above-described embodiments. In the example of FIG. 15, the images displayed in the display screen include the words "Caution—Pedestrian Near Crossing in Right Turn Path."

The images displayed in the display screen of the navigation device 5 include pedestrian marks 52 at the positions of pedestrians having collision risks with the vehicle in a map image 51 in the same manner as the above-described embodiments. Each pedestrian mark 52 is displayed in a display mode (light color and turn-on pattern) determined according to the assistance level.

FIG. 15(A) shows an image displayed on the display screen of the navigation device 5 of the vehicle C1 in the case that a single vehicle is present as shown in FIG. 14(A). In this case, the pedestrian mark 52 is displayed on the display screen of the navigation device 5 of the vehicle C1 in the same display mode as the indicator light 3 of the pedestrian. That is, the pedestrian mark 52 of the pedestrian P1 blinks fast in red, the pedestrian mark 52 of the pedestrian P2 blinks slowly in yellow, and the pedestrian mark 52 of the pedestrian P3 is maintained turned on in blue.

FIG. 15(B) shows an image displayed on the display screen of the navigation device 5 of the vehicle C1 in the case that multiple vehicles are present nearby as shown in FIG. 14(B). In this case, the assistance level of the vehicle C2 is Warn, and since the vehicle C2 has a higher collision risk than the vehicle C1, the pedestrian mark 52 of the pedestrian P2 blinks fast in red. Under this condition, the driver of the vehicle C1 cannot determine whether the color of the mark is associated with the own vehicle or not. Thus, the navigation device 5 is preferably configured to display an image such as characters indicating that the pedestrian mark 52 is associated with another vehicle.

The navigation device 5 may be configured to display the pedestrian mark 52 in the display mode determined based on the assistance level associated with the own vehicle. Under this condition, the pedestrian mark 52 in the display screen is turned on in a different manner from the indicator light 3. Thus, the navigation device 5 is preferably configured to display an image such as characters indicating that the pedestrian mark 52 is turned on in a different manner from the indicator light 3.

Figure 16:
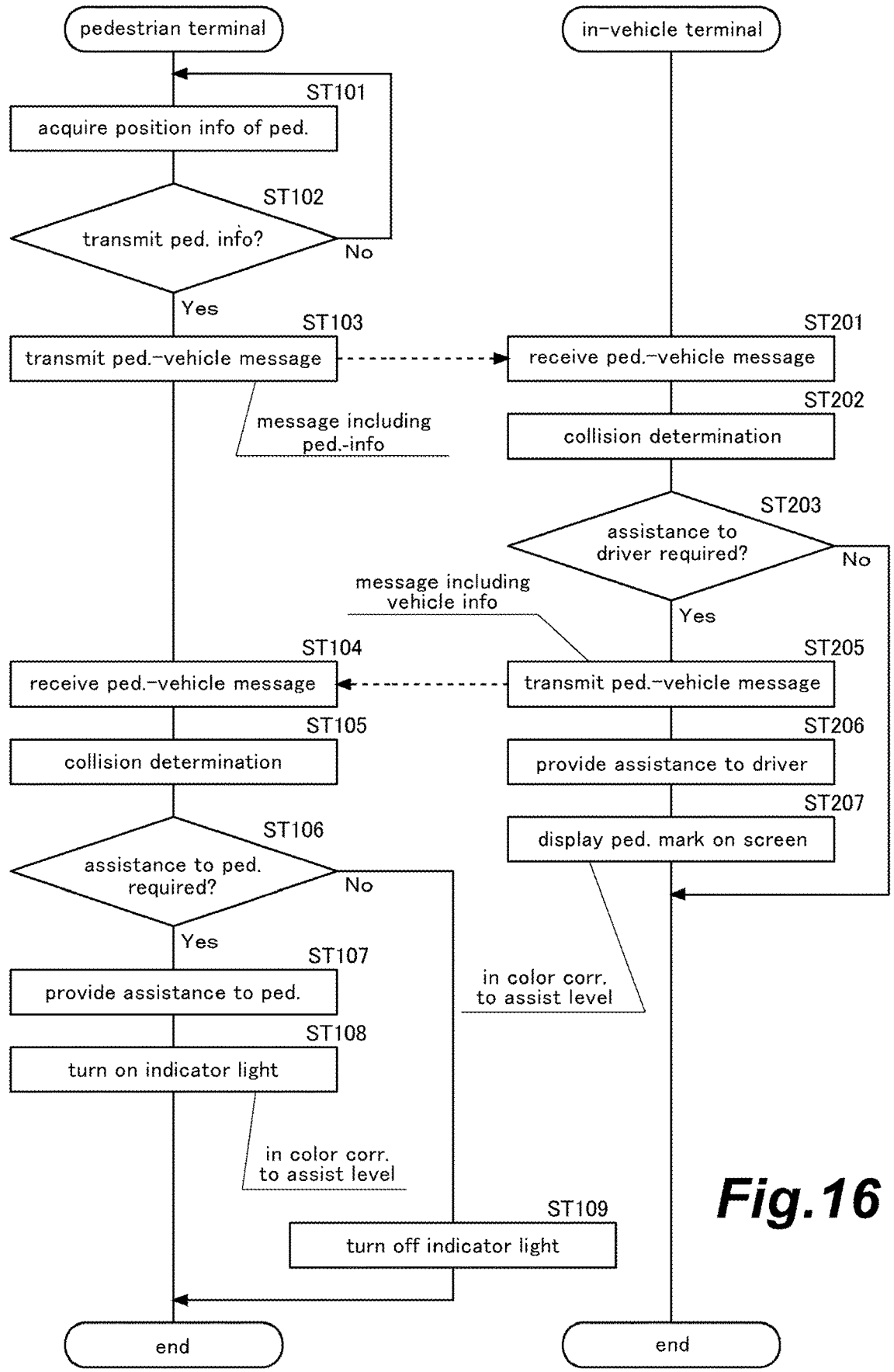
FIG. 16 is a flow chart showing operation procedures of a pedestrian terminal device 1 and an in-vehicle terminal device 4.

Next, operation procedures of the pedestrian terminal device 1 and the in-vehicle terminal device 4 will be described. FIG. 16 is a flow chart showing operation procedures of the pedestrian terminal device 1 and the in-vehicle terminal device 4.

In the present embodiment, the operation procedures of the pedestrian terminal device 1 and the in-vehicle terminal device 4 are generally similar to those shown FIG. 13, but different from those in FIG. 13 in that, in the present embodiment, when the pedestrian mark 52 is displayed on the navigation device 5 of the in-vehicle terminal device 4 (ST 207), the pedestrian mark 52 is displayed in a color determined according to the assistance level. (Warn, Alert, Provision of information).

Furthermore, in the present embodiment, when the indicator light 3 is turned on (ST 108), the indicator light 3 is turned on in a color determined according to the assistance level (Warn, Alert, Provision of information).

Figure 17:
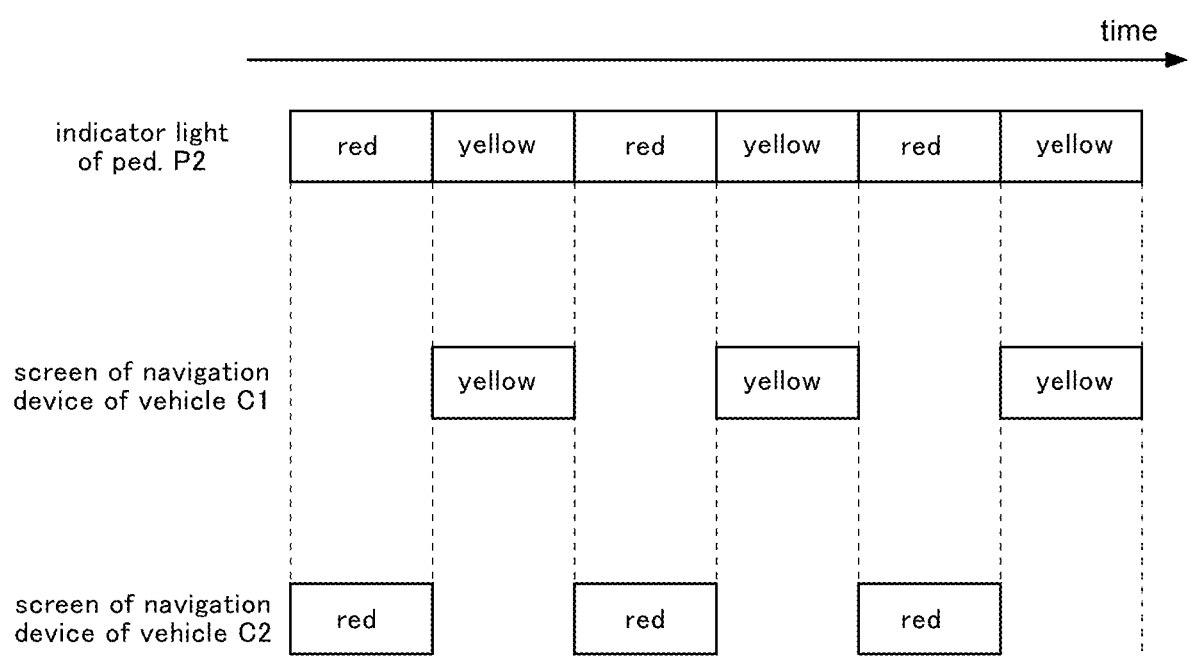
FIG. 17 is an explanatory view showing a time sharing control when conflicts occur between turn-on conditions.

Next, time sharing control when conflicts occur between turn-on conditions will be described. FIG. 17 is an explanatory view showing a time sharing control when conflicts occur between turn-on conditions.

In making a collision determination to determine collision risks of multiple vehicles present nearby with a pedestrian, due to different collision risk with different vehicles, conflicts can occur between the assistance levels (Warn, Alert, and Provision of information), which determine turn-on conditions. When conflicts occur between the turn-on conditions, time sharing control is performed on the turn-on conditions of the indicator light 3 and the image displayed on the display screen of the navigation device, which enables the driver of each vehicle to easily grasp the correspondence between each of the actual pedestrians and a corresponding pedestrian indication on the display screen of the navigation device 5.

In the example shown in FIG. 16, the pedestrian P2 sets the assistance level of the vehicle C1 to be Alert, and the vehicle C2 to be Warn. In this case, the indicator light 3 of the pedestrian P2 is controlled to be turned on alternately in red and yellow. In the navigation device 5 of the vehicle C1 having the assistance level of Alert for the pedestrian P2, the pedestrian mark 52 is displayed in yellow at the time when the indicator light 3 is turned on in yellow. In the navigation device 5 of the vehicle C2 having the assistance level of Warn for the pedestrian P2, the pedestrian mark 52 is displayed in red at the time when the indicator light 3 is turned on in red.

In this way, when time sharing control is performed on the turn-on of the indicator light 3 and the display of the pedestrian mark 52, the driver of each vehicle can recognize that the indicator light 3 associated with the own vehicle is one which is turned on in synchronized with the display of the pedestrian mark 52 on the navigation device 5, and also grasp the levels of the collision risks between the own vehicular and respective pedestrians.

Although the above description has been made with reference to the fourth embodiment, time sharing control for cases where conflicts occur between the turn-on conditions can be applied to other embodiments.

In other embodiments, when conflicts occur between the turn-on conditions, control may be performed on the direction and the color of the light emitted from the indicator light 3 such that the driver of each vehicle can see the indicator light 3 turned on in the color for the assistance level associated with the vehicle. In this case, the indicator light 3 may be configured such that the indicator light can emit lights separately in respective colors and to different directions, and the indicator light 3 may be controlled to emit lights to respective vehicles in the colors corresponding to the assistance levels associated with the respective vehicles.

While specific embodiments of the present invention are described herein for illustrative purposes, the present invention is not limited thereto. It will be understood that various changes, substitutions, additions, and omissions may be made for elements of the embodiments without departing from the scope of the invention. In addition, elements and features of the different embodiments may be combined with each other as appropriate to yield an embodiment which is within the scope of the present invention.

For example, although in the above-described embodiments, pedestrians; that is, persons walking on the road, carry pedestrian terminal devices, pedestrians in a broad sense may include persons carrying a pedestrian terminal device and riding a bicycle, an electric vehicle for seniors (senior car), an electric wheelchair, a farming machine, or like.

In addition, when certain types of vehicles are approaching, the traveling direction may be indicated by arrows, and examples of such vehicles include vehicles driven by elderly people (four-wheeled vehicles), vehicles of driving training schools (four-wheeled vehicles), vehicles with a beginner driver's mark (four-wheeled vehicles), vehicles driven by drivers without confidence in driving (four-wheeled vehicles), and motorcycles. Since there are many accidents in which vehicles turning left (turning right, in some countries) hit motorcycles, the traveling direction of a motorcycle may be indicated by an arrow only when the vehicle (four-wheeled vehicle) makes a left turn. In some cases, when a dangerous vehicle (four-wheeled vehicle) such as a vehicle weaving or speeding is approaching, the color of the arrow may be changed or an X mark may be attached to the image.

When an emergency vehicle such as an ambulance is approaching, a special indication may be displayed, for example, by changing the color of arrows to indicate emergency vehicles.

In the present embodiment, the in-vehicle terminal device is described as one mounted on a vehicle (four-wheeled vehicle), but the vehicle on which the in-vehicle terminal device is mounted may be a motorcycle or other types of vehicles.

In the above-described embodiments, pedestrians carry the indicator lights and the driver of a vehicle can see lights from the turned-on indicator lights to recognize the pedestrians having certain collision risks with the own vehicle. However, the system may be conversely configured; that is, a vehicle may be equipped with an indicator light so that each pedestrian can recognize the vehicle having a certain collision risk therewith. Alternatively, a mobile information terminal device carried by a pedestrian may be provided with a display screen, on which marks are displayed to indicate the presence of any vehicle having a collision risk with the pedestrian, where the vehicle may be a car, a bicycle, an electric vehicle for seniors (senior car), an electric wheelchair, a farm machine or the like.

Although, in the first and second embodiments, the in-vehicle terminal device instructs the pedestrian terminal device to turn on the pedestrian indicator light in a prescribed light color, turn-on instructions to the pedestrian terminal device may be provided by a roadside device (for example, a controller for a traffic light) disposed on a roadside.

In the second embodiment, the indicator lights of respective pedestrians can be turned on in different light colors and different turn-on patterns. Since, in such a configuration, each pedestrian can be identified by the light color and the turn-on pattern of the indicator light, the position data of pedestrians used in processing such as a collision determination may be corrected by using a camera; that is, the indicator lights are shot by the camera to provide a photograph image showing the actual positional relationship between the vehicle and the pedestrians, which is used to correct position data of the pedestrians.

INDUSTRIAL APPLICABILITY

A pedestrian-vehicle communication system and a safe-driving assistance method according to the present invention achieve the effect of enabling a driver in driving a vehicle to quickly and assuredly recognize a pedestrian having a collision risk with the vehicle even when the driver is unable to easily recognize the pedestrian by eyes, such as during night time, and are useful as a pedestrian-vehicle communication system comprising an in-vehicle terminal device mounted on a vehicle and a pedestrian terminal device carried by a pedestrian, wherein pedestrian position information and vehicle position information are transmitted and received between the in-vehicle terminal device and the pedestrian terminal device via pedestrian-vehicle communication, or a safe-driving assistance method for assisting a driver in driving a vehicle by performing pedestrian-vehicle communication.

GLOSSARY 1 pedestrian terminal device
2 mobile information terminal device
3 indicator light
4 in-vehicle terminal device
5 navigation device (display device)
11 positioner
12 pedestrian-vehicle communicator
13 I/O section
14 short range communicator
15 controller
21 message transmission controller
22 collision determiner
23 assistance controller
24 turn-on controller
31 positioner
32 pedestrian-vehicle communicator
34 controller
41 message transmission controller
42 collision determiner
43 assistance controller
44 turn-on instruction generator
45 display controller

The invention claimed is:

1. A pedestrian-vehicle communication system comprising an in-vehicle terminal device mounted on a vehicle and a pedestrian terminal device carried by a pedestrian, wherein pedestrian position information and vehicle position information are transmitted and received between the in-vehicle terminal device and the pedestrian terminal device via pedestrian-vehicle communication, wherein the in-vehicle terminal device comprises:
a collision determiner configured to determine a collision risk based on the pedestrian position information and the vehicle position information;
a turn-on instruction generator configured to generate turn-on instruction information which, when the collision determiner determines that the pedestrian has the collision risk, causes an indicator light carried by the pedestrian to be turned on in a light color specific to the vehicle on which the in-vehicle terminal device is mounted; and
a pedestrian-vehicle communicator configured to transmit the turn-on instruction information to the pedestrian terminal device via the pedestrian-vehicle communication; and wherein the pedestrian terminal device comprises:
a pedestrian-vehicle communicator configured to receive the turn-on instruction information transmitted from the in-vehicle terminal device; and
a turn-on controller configured to turn on the indicator light based on the turn-on instruction information,
wherein, when there is a plurality of pedestrians having collision risks with the vehicle, the turn-on instruction generator of the in-vehicle terminal device generates the turn-on instruction information which causes a plurality of indicator lights to be turned on in respective different light colors.

2. The pedestrian-vehicle communication system according to claim 1, wherein, upon receiving the turn-on instruction information from a plurality of in-vehicle terminal devices, the turn-on controller of the pedestrian terminal device causes the indicator light to be turned on based on the turn-on instruction information which is transmitted from an in-vehicle terminal device of a vehicle having a highest collision risk.

3. The pedestrian-vehicle communication system according to claim 1, wherein the turn-on instruction generator of the in-vehicle terminal device generates turn-on instruction information which causes the indicator light without any assigned light color to be turned on in a prescribed light color based on color information transmitted from the pedestrian terminal device.

4. The pedestrian-vehicle communication system according to claim 1, wherein the in-vehicle terminal device comprises a display controller configure to display an image representing a position of the pedestrian superimposed on a map image on a display screen of a display device mounted on the vehicle, and
wherein the display controller causes the display device to display the image representing the position of the pedestrian in a same color as the light color of the indicator light of the pedestrian.

5. A pedestrian-vehicle communication system comprising an in-vehicle terminal device mounted on a vehicle and a pedestrian terminal device carried by a pedestrian, wherein pedestrian position information and vehicle position information are transmitted and received between the in-vehicle terminal device and the pedestrian terminal device via pedestrian-vehicle communication, wherein the pedestrian terminal device comprises:
a collision determiner configured to determine a collision risk based on the pedestrian position information and the vehicle position information;
a turn-on controller configured, when the collision determiner determines that the collision risk is present, to turn on an indicator light carried by the pedestrian in a prescribed light color, and wherein the in-vehicle terminal device comprises:
a pedestrian-vehicle communicator configured to receive color information indicating the prescribed light color from the pedestrian terminal device; and
a display controller configured to cause a display device mounted on the vehicle to display an image representing a position of the pedestrian in a same color as the prescribed light color indicated by the color information.

6. The pedestrian-vehicle communication system according to claim 5, wherein the turn-on controller of the pedestrian terminal device causes the indicator light to be turned on in the light color which is set depending on a user attribute of the pedestrian.

7. The pedestrian-vehicle communication system according to claim 6, the user attribute is classified according to a possibility of taking a dangerous action.

8. The pedestrian-vehicle communication system according to claim 5, wherein the collision determiner of the pedestrian terminal device determines a plurality of assistance levels according to the collision risk, and
the turn-on controller of the pedestrian terminal device sets the light color depending on the assistance levels.

9. The pedestrian-vehicle communication system according to claim 8, wherein, when a plurality of vehicles have collision risks with the pedestrian, the turn-on controller of the pedestrian terminal device sets the light color based on an assistance level for a vehicle having a highest collision risk with the pedestrian.

10. The pedestrian-vehicle communication system according to claim 5, the collision determiner of the pedestrian terminal device determines a plurality of assistance levels according to the collision risk, and
the turn-on controller of the pedestrian terminal device changes a turn-on pattern of the indicator light depending on the assistance levels.

11. An in-vehicle terminal device mounted on a vehicle for performing pedestrian-vehicle communication with a pedestrian terminal device carried by a pedestrian, wherein pedestrian position information and vehicle position information are transmitted and received between the in-vehicle terminal device and the pedestrian terminal device via the pedestrian-vehicle communication, the in-vehicle terminal device comprising:
a collision determiner configured to determine a collision risk based on the pedestrian position information and the vehicle position information;
a turn-on instruction generator configured to generate turn-on instruction information which, when the collision determiner determines that the pedestrian has the collision risk, causes an indicator light carried by the pedestrian to be turned on in a light color specific to the vehicle on which the in-vehicle terminal device is mounted; and
a pedestrian-vehicle communicator configured to transmit the turn-on instruction information to the pedestrian terminal device via the pedestrian-vehicle communication,
wherein, when there is a plurality of pedestrians having collision risks with the vehicle, the turn-on instruction generator generates the turn-on instruction information which causes a plurality of indicator lights to be turned on in respective different light colors.

12. An in-vehicle terminal device mounted on a vehicle for performing pedestrian-vehicle communication with a pedestrian terminal device carried by a pedestrian, wherein pedestrian position information and vehicle position information are transmitted and received between the in-vehicle terminal device and the pedestrian terminal device via the pedestrian-vehicle communication, comprising:
a pedestrian-vehicle communicator configured to receive color information from the pedestrian terminal device, the color information indicating a light color of an indicator light carried by the pedestrian; and
a display controller mounted on the vehicle configured to cause a display device mounted on the vehicle to display an image representing a position of the pedestrian in a same color as the light color indicated by the color information.

13. A pedestrian terminal device carried by a pedestrian for performing pedestrian-vehicle communication with an in-vehicle terminal device mounted on a vehicle, wherein pedestrian position information and vehicle position information are transmitted and received between the in-vehicle terminal device and the pedestrian terminal device via the pedestrian-vehicle communication, the pedestrian terminal device comprising:
a short range communicator configured to perform communication with an indicator light carried by the pedestrian;
a pedestrian-vehicle communicator configured to receive turn-on instruction information from the in-vehicle terminal device, the turn-on instruction information causing the indicator light carried by the pedestrian to be turned on in a light color specific to the vehicle on which the in-vehicle terminal device is mounted; and
a turn-on controller to turn on the indicator light by the short range communicator based on the turn-on instruction information,
wherein, upon receiving the turn-on instruction information from a plurality of in-vehicle terminal devices, the turn-on controller causes the indicator light to be turned on based on the turn-on instruction information which is transmitted from an in-vehicle terminal device of a vehicle having a highest collision risk.

14. A safe-driving assistance method for assisting a driver in driving a vehicle by performing pedestrian-vehicle communication through which pedestrian position information and vehicle position information are transmitted and received between an in-vehicle terminal device mounted on the vehicle and a pedestrian terminal device carried by a pedestrian,
wherein the in-vehicle terminal device:
determines a collision risk based on the pedestrian position information and the vehicle position information;
generates turn-on instruction information which, when the collision determiner determines that the pedestrian has the collision risk, causes an indicator light carried by the pedestrian to be turned on in a light color specific to the vehicle on which the in-vehicle terminal device is mounted; and
transmits the turn-on instruction information to the pedestrian terminal device via the pedestrian-vehicle communication; and
wherein the pedestrian terminal device:
receives the turn-on instruction information transmitted from the in-vehicle terminal device; and
turns on the indicator light based on the turn-on instruction information,
wherein, when there is a plurality of pedestrians having collision risks with the vehicle, the in-vehicle terminal device generates the turn-on instruction information which causes a plurality of indicator lights to be turned on in respective different light colors.

15. A safe-driving assistance method for assisting a driver in driving a vehicle by performing pedestrian-vehicle communication through which pedestrian position information and vehicle position information are transmitted and received between an in-vehicle terminal device mounted on the vehicle and a pedestrian terminal device carried by a pedestrian, wherein the pedestrian terminal device:
determines a collision risk based on the pedestrian position information and the vehicle position information;
when the collision determiner determines that the collision risk is present, turns on an indicator light carried by the pedestrian in a prescribed light color; and
transmits color information indicating the prescribed light color to the in-vehicle terminal device via the pedestrian-vehicle communication, and
wherein the in-vehicle terminal device:
receives the color information transmitted from the pedestrian terminal device; and
causes a display device mounted on the vehicle to display an image representing a position of the pedestrian in a same color as the light color of the indicator light of the pedestrian.

\* \* \* \* \*